(12) United States Patent
Toshioka

(10) Patent No.: US 7,832,199 B2
(45) Date of Patent: Nov. 16, 2010

(54) EXHAUST PURIFICATION SYSTEM FOR INTERNAL COMBUSTION ENGINE

(75) Inventor: Shunsuke Toshioka, Numazu (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 983 days.

(21) Appl. No.: 11/631,778

(22) PCT Filed: Oct. 14, 2005

(86) PCT No.: PCT/JP2005/019357

§ 371 (c)(1),
(2), (4) Date: Jan. 8, 2007

(87) PCT Pub. No.: WO2006/041223

PCT Pub. Date: Apr. 20, 2006

(65) Prior Publication Data

US 2008/0092530 A1 Apr. 24, 2008

(30) Foreign Application Priority Data

Oct. 15, 2004 (JP) .............................. 2004-301735

(51) Int. Cl.
*F01N 3/00* (2006.01)
*F01N 3/10* (2006.01)
(52) U.S. Cl. .............................. 60/286; 60/276; 60/287; 60/288; 60/295; 60/301; 60/303
(58) Field of Classification Search .................... 60/276, 60/284, 286, 287, 288, 292, 295, 301, 303
See application file for complete search history.

(56) References Cited

U.S. PATENT DOCUMENTS 5,713,199 A  2/1998  Takeshima et al.

(Continued)

FOREIGN PATENT DOCUMENTS

EP  0 735 250 A2  10/1996

(Continued)

OTHER PUBLICATIONS

Extended European Search Report issued in EP Application No. 05795135.2 on Apr. 29, 2010.

*Primary Examiner*—Thomas E. Denion
*Assistant Examiner*—Audrey Klasterka
(74) *Attorney, Agent, or Firm*—Oliff & Berridge, PLC

(57) ABSTRACT

Art is provided for an exhaust purification system for an internal combustion engine, which decreases an amount of exhaust flowing to a storage-reduction type NOx catalyst and supplies a reducer to the NOx catalyst so as to reduce NOx stored in the NOx catalyst, wherein the manner in which the reducer is dispersed in the NOx catalyst can be controlled to achieve more reliable execution of a NOx reduction treatment. Air-fuel ratio detecting unit is disposed upstream and downstream of the storage-reduction type NOx catalyst. During a predetermined period subsequent to decreasing an amount of exhaust flowing to the NOx catalyst and adding the reducer to the exhaust, a reducer-adding timing is changed such that a difference between an air-fuel ratio detected by the air-fuel ratio detecting unit disposed upstream of the NOx catalyst and an air-fuel ratio detected by the air-fuel ratio detecting unit disposed downstream of the NOx catalyst becomes a predetermined target value.

10 Claims, 10 Drawing Sheets

U.S. PATENT DOCUMENTS

| | | | |
|---|---|---|---|
| 6,735,940 B2 * | 5/2004 | Stroia et al. | 60/286 |
| 2003/0192306 A1 * | 10/2003 | Nakatani et al. | 60/288 |
| 2004/0006977 A1 * | 1/2004 | Nakatani et al. | 60/288 |
| 2004/0154285 A1 | 8/2004 | Nagaoka et al. | |

FOREIGN PATENT DOCUMENTS

| | | |
|---|---|---|
| EP | 1 273 337 A1 | 1/2003 |
| EP | 1 445 441 A1 | 8/2004 |
| JP | 07-102956 | 4/1995 |
| JP | A 10-121944 | 5/1998 |
| JP | A 2000-230420 | 8/2000 |
| JP | A 2002-115532 | 4/2002 |
| JP | A 2002-213286 | 7/2002 |
| JP | A 2003-041929 | 2/2003 |
| JP | A 2003-214150 | 7/2003 |
| JP | A 2004-052603 | 2/2004 |

* cited by examiner

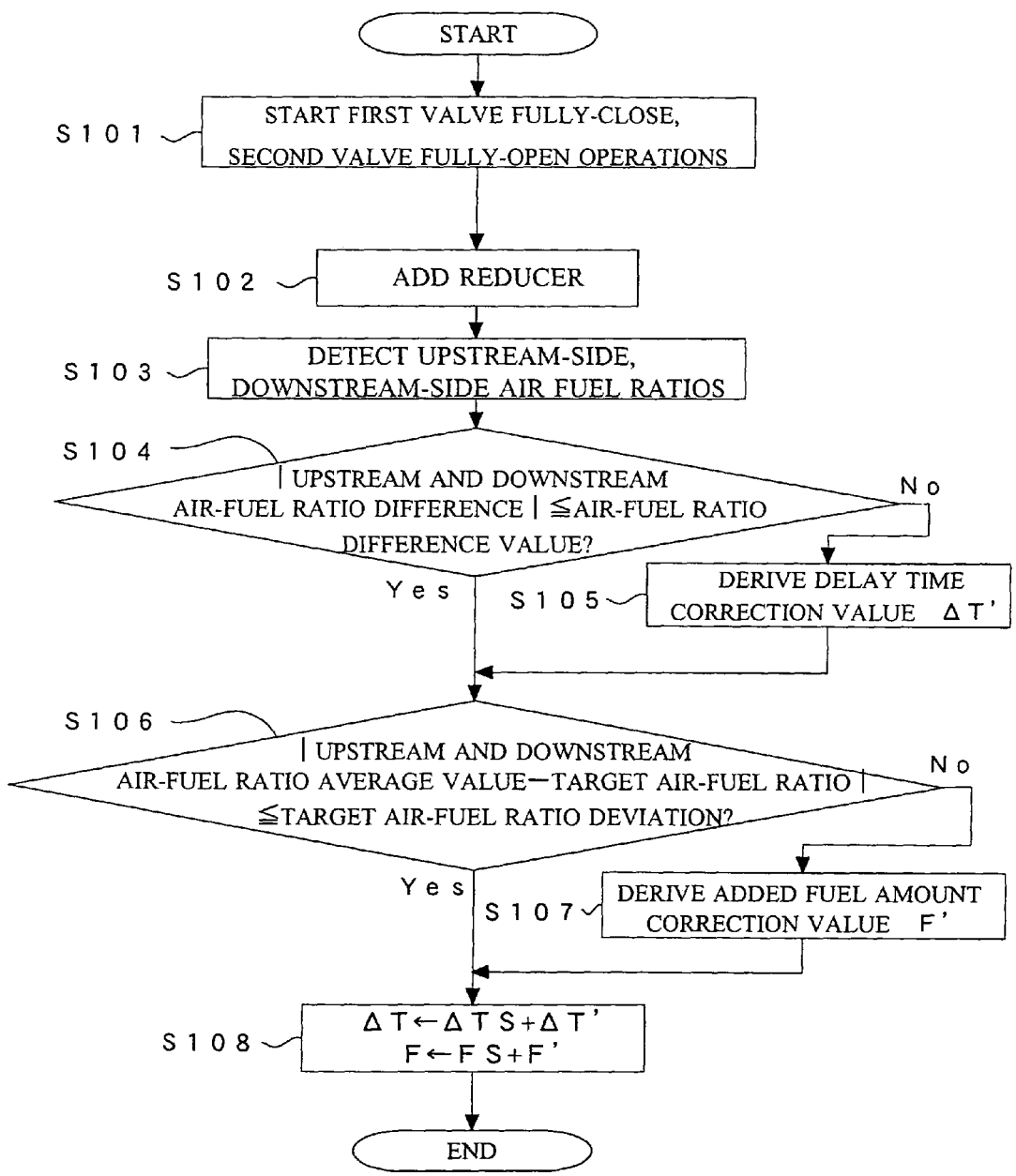

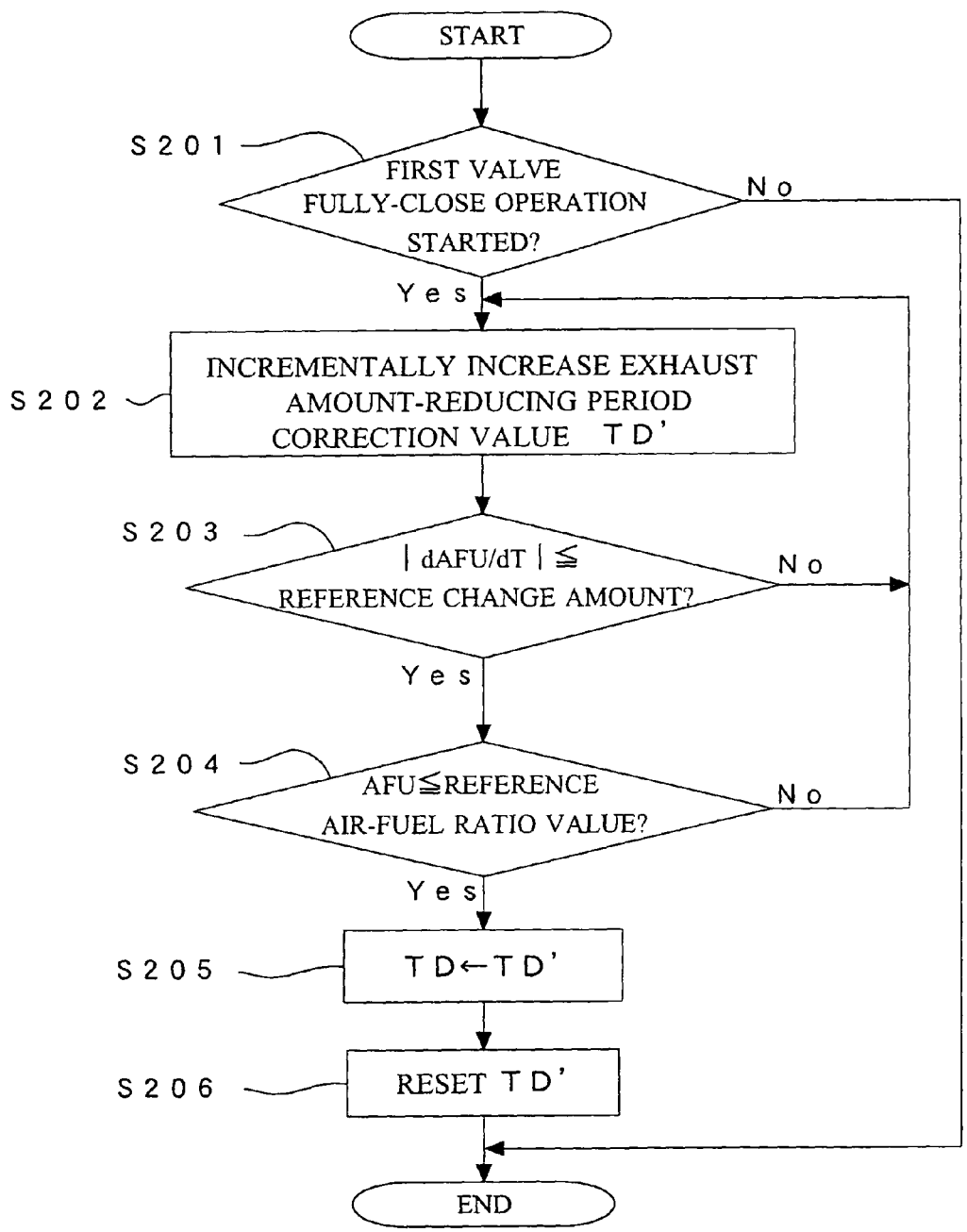

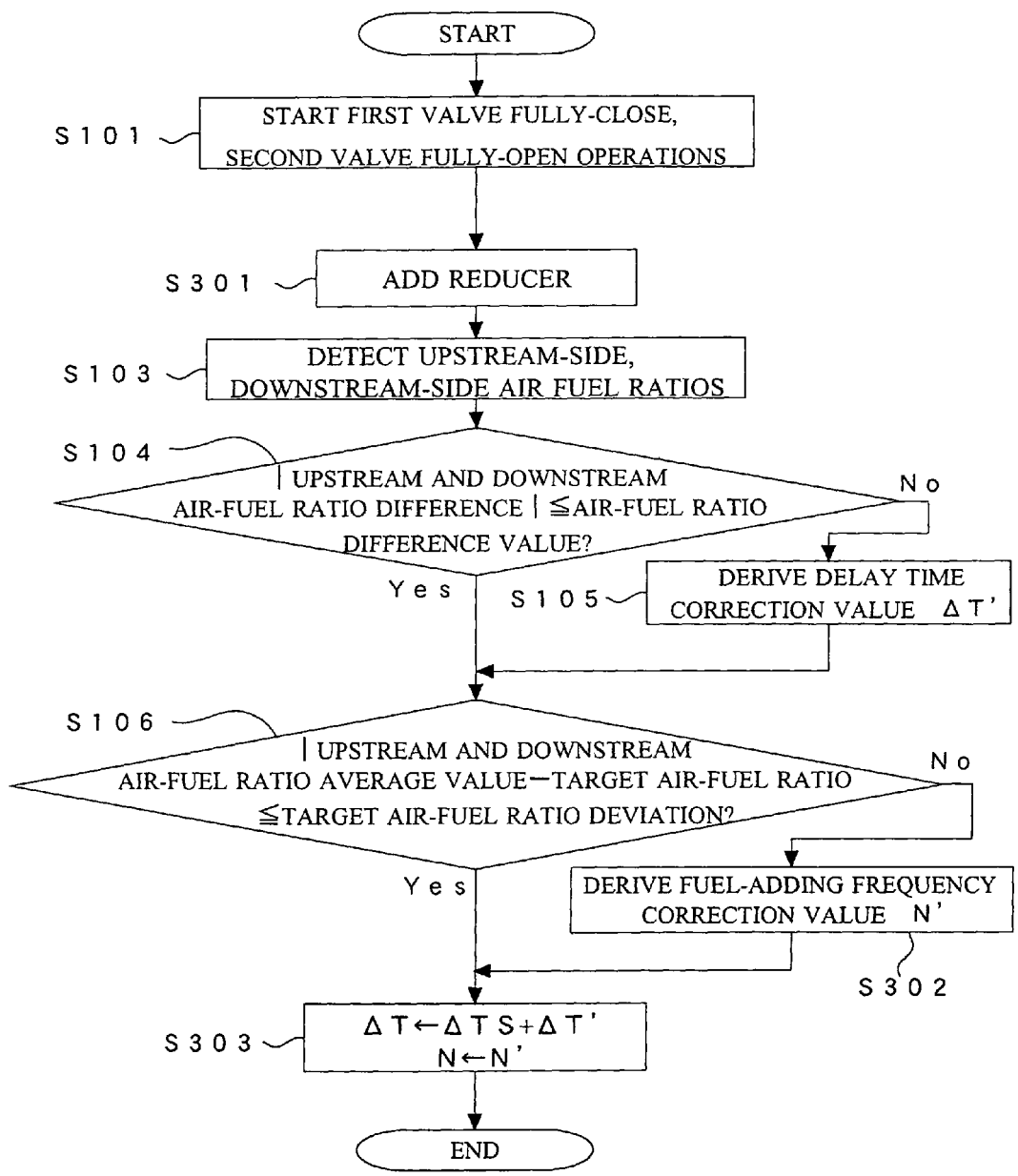

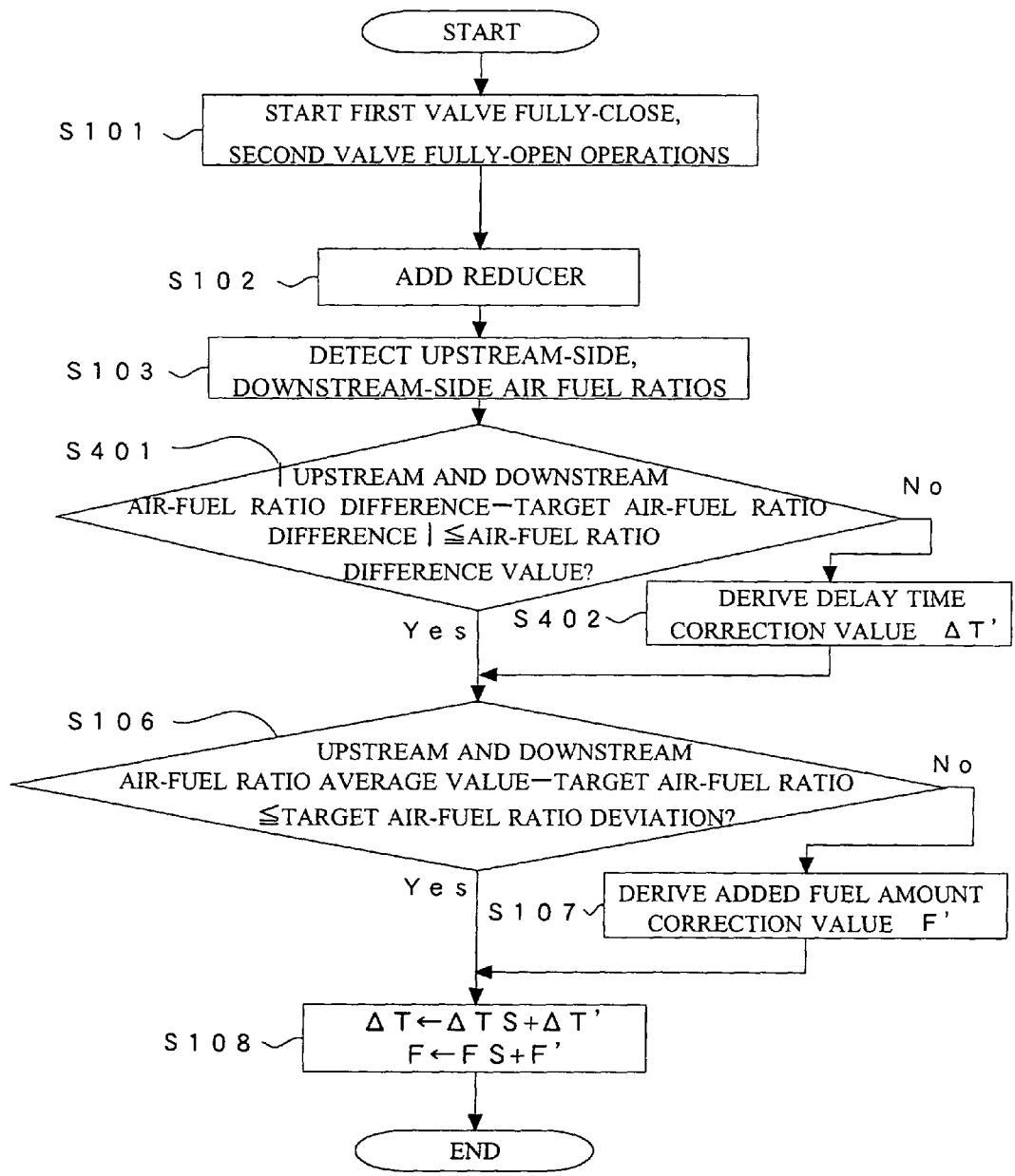

EXHAUST PURIFICATION SYSTEM FOR INTERNAL COMBUSTION ENGINE

TECHNICAL FIELD

The present invention relates to an exhaust purification system for an internal combustion engine.

BACKGROUND ART

Normally NOx and other harmful substances are contained in exhaust gas from internal combustion engines. A NOx catalyst is provided in the exhaust system of the internal combustion engine in order to purify NOx in the exhaust. In the case of a storage-reduction type NOx catalyst used for this purpose, however, purification performance decreases as the amount of NOx stored increases. As a countermeasure, fuel that acts as a reducer is supplied to the storage-reduction type NOx catalyst so as to reduce and release NOx stored in the catalyst (hereinafter referred to as a "NOx reduction treatment"). It is also common knowledge that SOx in exhaust that is stored in the storage-reduction type NOx catalyst results in decreased purification performance, due to so-called SOx poisoning. Fuel that acts as a reducer is sometimes supplied to the storage-reduction type NOx catalyst in order to counteract SOx poisoning (hereinafter referred to as a "SOx poisoning recovery treatment").

When supplying fuel that acts as a reducer to the storage-reduction type NOx catalyst, however, some of the supplied fuel may not be fully used in the oxidation reaction within the storage-reduction type NOx catalyst, if the amount of exhaust flow introduced to the storage-reduction type NOx catalyst is not appropriate. This means that the NOx reduction treatment and the SOx poisoning recovery treatment may not be adequately performed, and fuel efficiency may also decrease.

In light of this, art has been proposed that, in order to reduce the amount of accumulated NOx in the NOx catalyst, at first reduces the amount of exhaust gas flowing to the NOx catalyst, and next supplies a reducer when a preset time has passed after the reduction. Furthermore, art has been proposed that uses an oxygen concentration sensor to detect an oxygen concentration in exhaust gas discharged from the NOx catalyst when a reducer is supplied. A high purification rate is thus achieved by correcting the above-mentioned preset time so that the peak value of the oxygen concentration coincides with a target value (see Japanese Patent Application Publication No. JP-A-2004-52603 for an example).

However, the dispersibility of the added fuel remains poor in the above cases, and the fuel may tend to concentrate at a portion of the NOx catalyst. This tendency becomes greater in cases where the NOx catalyst has a long length, or a plurality of NOx catalysts is arranged in series. Even when the fuel-adding timing is controlled based only on the state quantity of exhaust gas downstream of the NOx catalyst, there is a limit in such cases as to how much the dispersibility of the added fuel in the NOx catalyst can be raised. More improvements can still be made to ensure that the NOx reduction treatment is sufficiently performed throughout the entire NOx catalyst. On a side note, related art is also described in Japanese Patent Application Publication No. JP-A-H10-121944, Japanese Patent Application Publication No. JP-A-2000-230420, and Japanese Patent Application Publication No. JP-A-2003-214150.

DISCLOSURE OF THE INVENTION

In an exhaust purification system for an internal combustion engine that reduces NOx stored in a storage-reduction type NOx catalyst by reducing an amount of exhaust flowing to the NOx catalyst and supplying a reducer to the NOx catalyst, it is an object of the present invention to provide art capable of performing more reliable NOx reduction treatment by controlling a dispersion of the reducer in the NOx catalyst.

In order to achieve the above object, the present invention is characterized by disposing air-fuel ratio detecting unit upstream and downstream of a storage-reduction type NOx catalyst. It is also characterized by changing a reducer-adding timing, such that a difference between an air-fuel ratio detected by the air-fuel ratio detecting unit disposed upstream of the NOx catalyst and an air-fuel ratio detected by the air-fuel ratio detecting unit disposed downstream, during a predetermined period subsequent to decreasing an amount of exhaust flowing to the NOx catalyst and adding the reducer to the exhaust, becomes a predetermined target value.

More specifically, an exhaust purification system for an internal combustion engine comprises:

a storage-reduction type NOx catalyst that is disposed in an exhaust passage of the internal combustion engine and purifies NOx in exhaust;

reducer-adding unit that is disposed on an upstream side of the storage-reduction type NOx catalyst in the exhaust passage and adds a reducer to exhaust; and exhaust amount-reducing unit that reduces an amount of exhaust flowing to the storage-reduction type NOx catalyst, wherein a reduction treatment of NOx is performed for the storage-reduction type NOx catalyst by at least the reducer-adding unit adding the reducer to exhaust while the exhaust amount-reducing unit reduces the amount of exhaust flowing to the storage-reduction type NOx catalyst, the exhaust purification system for an internal combustion engine further comprising:

upstream-side air-fuel ratio detecting unit that is disposed upstream of the storage-reduction type NOx catalyst in the exhaust passage and downstream of the reducer-adding unit, and that detects an air-fuel ratio of exhaust; and downstream-side air-fuel ratio detecting unit that is disposed downstream of the storage-reduction type NOx catalyst in the exhaust passage, and that detects an air-fuel ratio of exhaust, wherein the reducer-adding unit changes a reducer-adding timing during a predetermined period subsequent to the reducer-adding unit adding the reducer, such that a difference between an air-fuel ratio value detected by the upstream-side air-fuel ratio detecting unit and an air-fuel ratio value detected by the downstream-side air-fuel ratio detecting unit becomes a predetermined target value.

As described above, the air-fuel ratio detecting unit is disposed upstream and downstream of the storage-reduction type NOx catalyst, and exhaust amount-reducing unit reduces the amount of exhaust flowing to the NOx catalyst and add the reducer to the exhaust to perform the NOx reduction treatment for the NOx catalyst. In such case, the amount of exhaust flowing to the NOx catalyst decreases in conjunction with the operation of the exhaust amount-reducing unit. During the period when the exhaust amount is decreasing, the reducer added by the reducer-adding unit disperses in the NOx catalyst and NOx in the vicinity of the dispersion is reduced.

When the amount of exhaust flowing to the NOx catalyst is decreasing, the reducer added from the reducer-adding unit may disperse biased toward an upstream-side portion or a downstream-side portion in the NOx catalyst. In such case, the difference in the air-fuel ratios upstream and downstream of the NOx catalyst increases while the amount of exhaust flowing to the NOx catalyst decreases. For example, if the reducer disperses biased toward an upstream-side portion in the NOx catalyst, then the air-fuel ratio upstream of the NOx decreases and the air-fuel ratio downstream increases. Conversely, if the reducer disperses biased toward a downstream-side portion in the NOx catalyst, then the air-fuel ratio downstream of the NOx catalyst decreases, and the air-fuel ratio upstream increases.

Hence, in the present invention, the NOx reduction treatment for the storage-reduction type NOx catalyst is performed by decreasing the amount of exhaust flowing to the NOx catalyst and adding the reducer to the exhaust using the reducer-adding unit. Provided in such case are upstream-side air-fuel ratio detecting unit that is disposed upstream of the NOx catalyst and downstream of the reducer-adding unit, and downstream-side air-fuel ratio detecting unit that is disposed downstream of the NOx catalyst in the exhaust passage. The reducer-adding unit change a reducer-adding timing, such that a difference between an air-fuel ratio value detected by the upstream-side air-fuel ratio detecting unit and an air-fuel ratio value detected by the downstream-side air-fuel ratio detecting unit, during a predetermined period subsequent to the reducer-adding unir adding the reducer, becomes a predetermined target value.

Thus during the period when the exhaust amount-reducing unit is decreasing the amount of exhaust flowing to the NOx catalyst, it is possible to appropriately change the manner in which the reducer added from the reducer-adding unit is dispersing. Consequently, the reducer can be dispersed so as to enable more efficient reduction of NOx in the NOx catalyst, and the NOx reduction treatment can be more reliably performed for the NOx catalyst.

For example, by setting the above-mentioned predetermined target value to zero, the reducer can be substantially dispersed evenly and mainly at a central portion of the NOx catalyst during the period when the amount of exhaust flowing to the NOx catalyst is decreased. Consequently, the NOx reduction treatment can be more reliably performed for the entire NOx catalyst.

In addition, the present invention may be further provided with a bypass passage that makes the exhaust bypass the storage-reduction type NOx catalyst , wherein the exhaust amount-reducing unit is a valve that reduces the amount of exhaust flowing to the storage-reduction type NOx catalyst by controlling an amount of exhaust passing through the bypass passage, and the predetermined period subsequent to the reducer-adding unit adding the reducer is a flow stop period during which the amount of exhaust flowing to the storage-reduction type NOx catalyst is substantially minimized due to the valve.

Namely, a simple control of opening and closing a valve can thus decrease the amount of exhaust flowing to the NOx catalyst, when a bypass passage that makes the exhaust bypass the storage-reduction type NOx catalyst is further provided, and the exhaust amount-reducing unit is a valve that decreases the amount of exhaust flowing to the NOx catalyst by controlling the amount of exhaust passing through the bypass passage. The amount of exhaust flowing to the NOx catalyst can thus be made substantially zero by using the valve to allow substantially all exhaust from the internal combustion engine to bypass the NOx catalyst and pass through the bypass passage.

Accordingly, once the amount of exhaust flowing to the NOx catalyst is decreased, distribution of the reducer added from the reducer-adding unit in the NOx catalyst can be more easily controlled. However, it should be noted in this case that when the valve is used to decrease the amount of exhaust flowing to the NOx catalyst, the amount of exhaust flowing to the NOx catalyst should be made substantially zero as explained above. In this manner, the reducer added from the reducer-adding unit can thus be made substantially stationary in the NOx catalyst when the amount of exhaust flowing to the NOx catalyst is decreased. However, achieving a substantially zero amount is not necessarily required, and the amount of exhaust flowing to the NOx catalyst may be substantially minimizing within a performance range of the valve. The description hereinafter will treat "substantially minimize" and "substantially (made) zero" as synonyms.

In the control, the reducer-adding unit changes the reducer-adding timing such that the difference between the air-fuel ratio value detected by the upstream-side air-fuel ratio detecting unit and the air-fuel ratio value detected by the downstream-side air-fuel ratio detecting unit becomes the predetermined target value. In such a control, the predetermined period for detecting the air-fuel ratio value detected by the upstream-side air- fuel ratio detecting unit and the air-fuel ratio value detected by the downstream-side air-fuel ratio detecting unit is designated as a flow stop period where the amount of exhaust flowing to the storage-reduction type NOx catalyst is substantially minimized by the valve. Consequently, when detecting the air-fuel ratios using the upstream-side air-fuel ratio detecting unit and the downstream-side air-fuel ratio detecting unit, fluctuations in the air-fuel ratios in the vicinity of both detecting unit can be suppressed to achieve improved detection accuracy in the respective air-fuel ratio detecting unit. In addition, during such period a travel speed of the reducer added from the reducer-adding unit is substantially minimal. Therefore, the air-fuel ratio can be detected during the most influential period for NOx reduction treatment, and consequently, dispersion of the reducer can be controlled during the most influential period for NOx reduction treatment.

In this case, the flow stop period may more specifically be a period when the amount of exhaust flowing to the NOx catalyst is substantially minimized (substantially zero except for valve leakage) by setting the valve to a fully-closed state. Moreover, the bypass passage may simply be an exhaust pipe that puts the NOx catalyst in communication with the upstream side and the downstream side of the exhaust passage. Alternatively, a second NOx catalyst such as a storage-reduction type NOx catalyst, may also be provided at a location therein. In the latter case, to perform NOx reduction treatment for the NOx catalyst, the amount of exhaust passing through the bypass passage may be increased so that NOx in the exhaust is purified by the second NOx catalyst; and to perform NOx reduction treatment for the second NOx catalyst, the amount of exhaust passing through the bypass passage may be decreased so that NOx in the exhaust is purified by the NOx catalyst.

Furthermore, according to the present invention, the flow stop period may be determined based on the change in the air-fuel ratio of exhaust detected by the upstream-side air-fuel ratio detecting unit being equal to or less than a predetermined change amount.

In this case, after the valve starts decreasing the amount of exhaust flowing to the NOx catalyst, the reducer added from the reducer-adding unit passes in the vicinity of the upstream-side air-fuel ratio detecting unit. Following this, the reducer further travels to the downstream side. At the time point where the reducer reaches the vicinity of the NOx catalyst, the amount of exhaust flowing to the NOx catalyst becomes substantially zero and the reducer remains substantially stationary at such position. Basically in other words, a relationship between an operation speed of the valve and the timing at which the reducer is added from the reducer-adding unit is preset such that the amount of exhaust flowing to the NOx catalyst is substantially zero at the time point where reducer added from the reducer-adding unit reaches to inside the NOx catalyst.

Over the course of such an operation, the air-fuel ratio detected by the upstream-side air-fuel ratio detecting unit sharply decreases when the reducer passes in the vicinity of the upstream-side air-fuel ratio detecting unit, and increases again when the reducer reaches the NOx catalyst. Thereafter, the air-fuel ratio becomes stable because the amount of exhaust flowing to the NOx catalyst is substantially zero. In other words, there is a high correlation between the change in the air-fuel ratio detected by the upstream-side air-fuel ratio detecting unit and the amount of exhaust flowing to the NOx catalyst.

Therefore, the period in which the amount of exhaust reducer flowing to the NOx catalyst is substantially zero, i.e., the flow stop period, may be determined based on the change in the air-fuel ratio detected by the upstream-side air-fuel ratio detecting unit being equal to or less than the predetermined change amount. This in turn eliminates the need to provide means for directly detecting the amount of exhaust flowing to the NOx catalyst, and allows commencement of the flow stop period to be detected by a simple method.

In addition, the flow stop period may also be determined based on a change value for the air-fuel ratio of exhaust detected by the upstream-side air-fuel ratio detecting unit being equal to or less than a predetermined change amount, and the air-fuel ratio of exhaust detected by the upstream-side air-fuel ratio detecting unit being equal to or less than a predetermined air-fuel ratio. Namely, if the flow stop period is determined based on only the change value for the air-fuel ratio of exhaust detected by the upstream-side air-fuel ratio detecting unit being equal to or less than the predetermined change amount, then there is a risk that a flow stop period will be determined based on a period prior to the reducer added from the reducer-adding unit passing in the vicinity of the upstream-side air-fuel ratio detecting unit. However, it is clear that the air-fuel ratio values detected by the upstream-side air-fuel ratio detecting unit completely differ before and after the reducer is added from the reducer-adding unit.

Therefore, the flow stop period is determined taking into consideration the change in the air-fuel ratio detected by the upstream-side air-fuel ratio detecting unit and an absolute value of the air-fuel ratio. Consequently, the flow stop period can be more accurately determined.

Note that, the flow stop period may be most easily determined by empirically finding in advance a time from commencement of operation of the exhaust amount-reducing unit until the amount of exhaust flowing to the NOx catalyst is substantially zero. The determination may then be made based on the passage of the empirically found time after commencement of operation of the exhaust amount-reducing means.

In addition, according to the present invention, the reducer-adding unit may change a reducer-adding amount such that the air-fuel ratio value detected by the upstream-side air-fuel ratio detecting unit and the air-fuel ratio value detected by the downstream-side air-fuel ratio detecting unit become predetermined target air-fuel ratios, when a difference between the air-fuel ratio value detected by the upstream-side air-fuel ratio detecting unit and the air-fuel ratio value detected by the downstream-side air-fuel ratio detecting unit is substantially the target value, during a predetermined period subsequent to the reducer-adding unit adding the reducer.

As described above, the manner in which the reducer is dispersed in the NOx catalyst can be controlled by changing the timing at which the reducer is added from the reducer-adding unit, such that the difference between the air-fuel ratio value detected by the upstream-side air-fuel ratio detecting unit and the air-fuel ratio value detected by the downstream-side air-fuel ratio detecting unit is a predetermined target value, during a predetermined period subsequent to the reducer-adding unit adding the reducer. By setting the target value to zero, for example, it is possible to centrally disperse the reducer mainly in the NOx catalyst without bias. However, in this case as well, there are times when the air-fuel ratio value detected by the upstream-side air-fuel ratio detecting unit and the air-fuel ratio value detected by the downstream-side air-fuel ratio detecting unit deviate from the air-fuel ratio values set as targets for the NOx reduction treatment.

In such case, there is a risk of increased difficulty in achieving sufficient reduction of NOx in the NOx catalyst. One factor behind this may be that an amount of reducer added from the reducer-adding unit has deviated from a set value, or that the set value itself is inappropriate.

Hence, according to the present invention, the reducer-adding unit changes a reducer-adding amount such that the air-fuel ratio value detected by the upstream-side air-fuel ratio detecting unit and the air-fuel ratio value detected by the downstream-side air-fuel ratio detecting unit become predetermined target air-fuel ratios, during a predetermined period subsequent to the reducer-adding unit adding the reducer when a difference between the air-fuel ratio value detected by the upstream-side air-fuel ratio detecting unit and the air-fuel ratio value detected by the downstream-side air-fuel ratio detecting unit is substantially the target value.

Thus, during the period in which the amount of exhaust flowing to the NOx catalyst is decreased, a distribution bias of the reducer dispersing in the NOx catalyst can be appropriately controlled. Moreover, the amount of reducer can be more reliably controlled to an optimum value for NOx reduction treatment. Accordingly, more reliable NOx reduction treatment can be performed for the NOx catalyst.

There are other factors behind the air-fuel ratio value detected by the upstream-side air-fuel ratio detecting unit and the air-fuel ratio value detected by the downstream-side air-fuel ratio detecting unit deviating from the air-fuel ratio values set as the targets for the NOx reduction treatment as described above. This includes a case where the amount of reducer added from the reducer-adding unit is appropriate, but the reducer added from the reducer-adding unit is dispersing excessively concentrated at a central portion of the NOx catalyst. In such case, instead of increasing the amount itself of reducer added from the reducer-adding unit, a frequency at which the reducer is added from the reducer-adding unit may be increased or a rate at which the reducer is added from the reducer-adding unit may be decreased when adding the reducer. Thus, a required amount of reducer can be added by adding a smaller rate of reducer over a long period of time. Therefore, the reducer can be evenly more dispersed throughout the entire NOx catalyst, and NOx reduction treatment can be performed well for the entire NOx catalyst.

In addition, according to the present invention, a plurality of the storage-reduction type NOx catalysts is disposed in series in the exhaust passage, the upstream-side air-fuel ratio detecting unit is disposed upstream of the plurality of the storage-reduction type NOx catalysts, the downstream-side air-fuel ratio detecting unit is disposed downstream of the plurality of storage-reduction type NOx catalysts, and the predetermined target value is set in accordance with an amount of reducer required for each catalyst among the plurality of storage-reduction type NOx catalysts for NOx reduction treatment.

Thus, as described above, if the reducer disperses biased toward an upstream-side portion in the NOx catalyst, then the air-fuel ratio upstream of the NOx catalyst decreases and the air-fuel ratio downstream increases. Conversely, if the reducer disperses biased toward a downstream-side portion in the NOx catalyst, then the air-fuel ratio downstream of the NOx catalyst decreases and the air-fuel ratio upstream increases. In other words, the manner in which the reducer disperses in the NOx catalyst can be changed by changing the timing at which the reducer is added from the reducer-adding unit, such that the difference between the air-fuel ratio value detected by the upstream-side air-fuel ratio detecting unit and the air-fuel ratio value detected by the downstream-side air-fuel ratio detecting unit becomes a predetermined value during the period when the amount of exhaust flowing to the NOx catalyst is decreased.

Using this principle, according to the present invention, if the NOx reduction treatment is performed for a plurality of storage-reduction type NOx catalyst disposed in the exhaust passage, the predetermined target value is changed in accordance with an amount of reducer required for each catalyst among the plurality of storage-reduction type NOx catalysts. For example, if the amount of reducer required for the NOx catalyst on the upstream side is greater than the amount of reducer required for the NOx catalyst on the downstream side, then the predetermined target value is changed such that a center of dispersion of the reducer during the flow stop period is positioned on the upstream side. Conversely, if the amount of reducer required for the NOx catalyst on the downstream side is greater than the amount of reducer required for the NOx catalyst on the upstream side, then the predetermined target value is changed such that a center of dispersion of the reducer during the flow stop period is positioned on the downstream side.

Thus in the case of a plurality of NOx catalysts provided in the exhaust passage, NOx reduction treatment can be performed well for all of the plurality of NOx catalysts, regardless of whether the amount of reducer required for each NOx catalyst for NOx reduction treatment is different. Furthermore, by performing the same control for one long NOx catalyst provided in the exhaust passage, NOx reduction treatment can be performed well for the entire NOx catalyst regardless of whether the amount of reducer required for respective portions of the NOx catalyst for NOx reduction treatment is different.

Note that the means according to the present invention for resolving the above-mentioned problems may be used in any number of possible combinations.

BRIEF DESCRIPTION OF THE DRAWINGS

FIG. 5 is a flowchart showing a NOx reduction treatment routine according to the first embodiment of the present invention;

FIG. 6 is a flowchart showing an exhaust amount-reducing period correction routine according to the first embodiment of the present invention;

FIG. 7 is a flowchart showing the NOx reduction treatment routine according to a second embodiment of the present invention;

FIG. 10 is a flowchart showing the NOx reduction treatment routine according to the third embodiment of the present invention.

BEST MODES FOR CARRYING OUT THE INVENTION

Hereinafter, examples of best modes for carrying out the present invention will be described in detail with reference to the accompanying drawings.

FIRST EMBODIMENT

Figure 1:
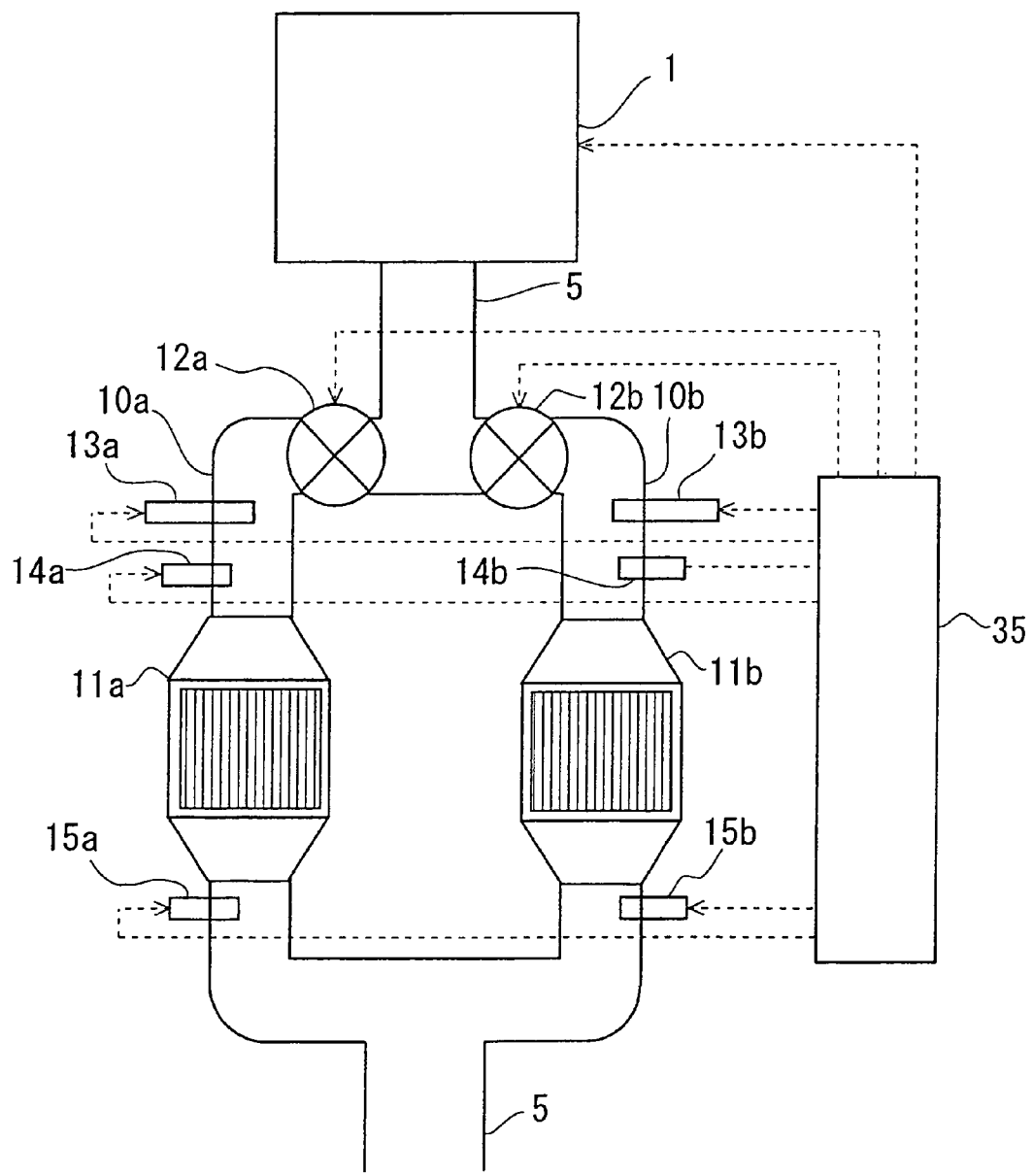
FIG. 1 is a view showing a schematic configuration of an internal combustion engine, and an exhaust system and a control system thereof, according to a first embodiment of the present invention.

FIG. 1 is a view showing a schematic configuration of an internal combustion engine, and an exhaust system and a control system thereof, according to a first embodiment of the present invention. Note that the inside of an internal combustion engine 1 and an intake system thereof are omitted in FIG. 1.

Referring to FIG. 1, the internal combustion engine 1 is connected with an exhaust pipe 5 to which exhaust is distributed from the internal combustion engine 1. The exhaust pipe 5 is connected downstream with a muffler (not shown). In addition, the exhaust pipe 5 branches into a first branch passage 10a and a second branch passage 10b. The first branch passage 10a and the second branch passage 10b meet downstream. The first branch passage 10a is provided with a first NOx catalyst 11a, which stores and reduces NOx in the exhaust, while the second branch passage 10b is provided with a similar second NOx catalyst 11b.

Also provided in the first branch passage 10a is a first valve 12a upstream of the first NOx catalyst 11a, which controls an amount of exhaust that passes through the first branch passage 10a. Likewise, the second branch passage 10b is also provided with a second valve 12b upstream of the second NOx catalyst 11b. It should be noted that the first valve 12a and the second valve 12b correspond to exhaust amount reducing unit in the present embodiment.

As FIG. 1 also shows, a first fuel-adding valve 13a and a first upstream-side air-fuel ratio sensor 14a are provided in series from the upstream side between the first valve 12a and the first NOx catalyst 11a of the first branch passage 10a. During NOx reduction treatment of the first NOx catalyst 11a, the first fuel-adding valve 13a adds fuel that acts as a reducer to the exhaust and the first upstream-side air-fuel ratio sensor 14a detects an air-fuel ratio of the exhaust upstream of the first NOx catalyst 11a. Similarly, a second fuel-adding valve 13b and a second upstream-side air-fuel ratio sensor 14b are provided in series from the upstream side between the second valve 12b and the second NOx catalyst 11b of the second branch passage 10b.

Provided downstream of the first NOx catalyst 11a of the first branch passage 10a is a first downstream-side air-fuel ratio sensor 15a, which detects an air-fuel ratio of the exhaust downstream of the first NOx catalyst 11a. Similarly, provided downstream of the second NOx catalyst 11b of the second branch passage 10b is a second downstream-side air-fuel ratio sensor 15b, which detects an air-fuel ratio of the exhaust downstream of the second NOx catalyst 11b. Note that the first upstream-side air-fuel ratio sensor 14a and the second upstream-side air-fuel ratio sensor 14b configure respective upstream-side air-fuel ratio detecting unit in the present embodiment. Likewise, the first downstream-side air-fuel ratio sensor 15a and the second downstream-side air-fuel ratio sensor 15b configure respective downstream-side air-fuel ratio detecting unit in the present embodiment. Also, the first reducer-adding valve 13a and the second reducer-adding valve 13b configure reducer-adding unit in the present embodiment.

Also provided for both the internal combustion engine 1 and the exhaust system thereof having a configuration as described above is an ECU (electronic control unit) 35 for controlling the internal combustion engine 1 and the exhaust system. The ECU 35 is a unit that controls an operating state and the like of the internal combustion engine 1 in accordance with operation conditions of the internal combustion engine 1 and requests from a driver. In addition, the ECU 35 also performs such controls as a NOx reduction treatment for the first NOx catalyst 11a and the second NOx catalyst 11b of the internal combustion engine 1.

The ECU 35 is connected via electrical wiring to various sensors related to control of the operating state of the internal combustion engine 1 such as a crank position sensor (not shown) and an accelerator position sensor, as well as the first upstream-side air-fuel ratio sensor 14a, the second upstream-side air-fuel ratio sensor 14b, the first downstream-side air-fuel ratio sensor 15a, and the second downstream-side air-fuel ratio sensor 15b. Output signals therefrom are input to the ECU 35. In addition, the ECU 35 is connected via electrical wiring to a fuel injection valve (not shown) and the like in the internal combustion engine 1, and also connected via electrical wiring to the first valve 12a, the second valve 12b, the first reducer-adding valve 13a, and the second reducer-adding valve 13b in the present embodiment. Such portions are controlled by the ECU 35.

Furthermore, the ECU 35 includes a CPU, a ROM, a RAM and the like. Programs for performing various controls for the internal combustion engine 1 and maps storing data are stored in the ROM. A program stored in the ROM of the ECU 35 includes a NOx reduction treatment routine for reducing and releasing NOx absorbed by the first NOx catalyst 11a and the second NOx catalyst 11b, as well as a SOx poisoning recovery treatment routine (for which a description is omitted here).

Figure 2:
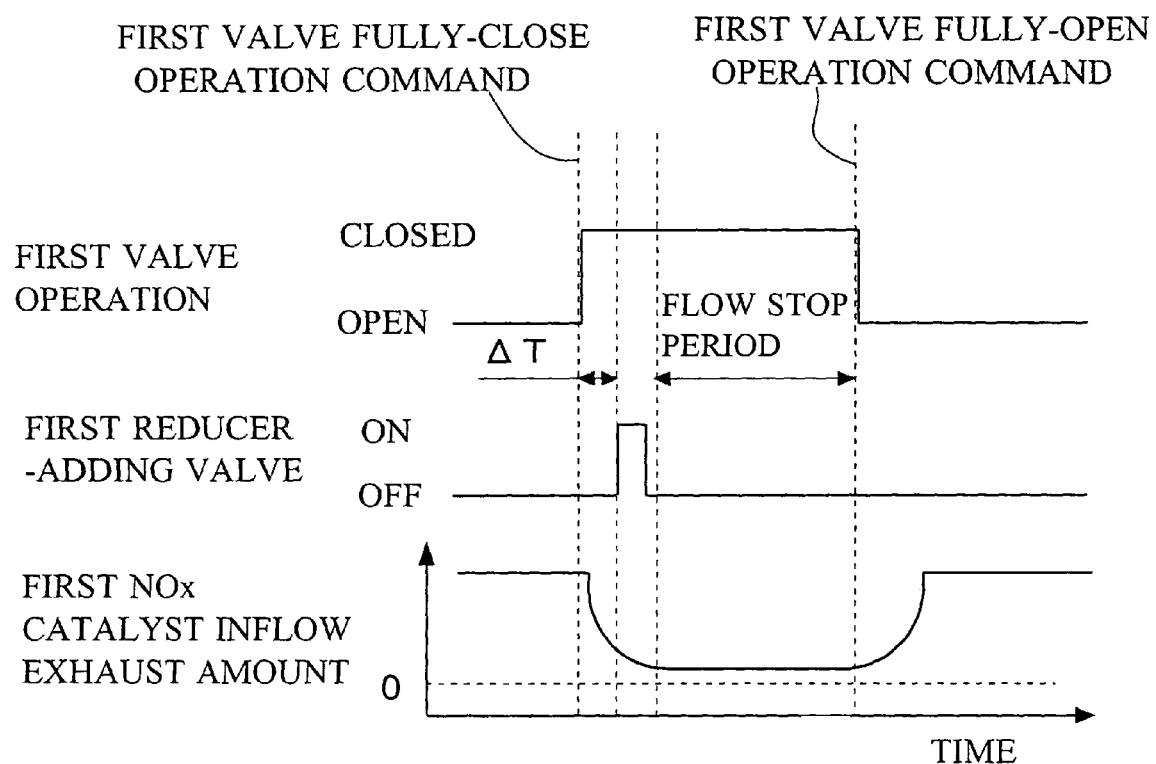
FIG. 2 is a timing chart showing a first valve open/closed timing, a first reducer-adding valve ON/OFF timing, and an amount of exhaust flowing to a first NOx catalyst according to the first embodiment of the present invention.

Next, as an example of performing the NOx reduction treatment in the above exhaust system of internal combustion engine 1, an explanation follows below with reference to FIG. 2 regarding the operation of the first valve 12a and the first reducer-adding valve 13a, as well as a variation in the amount of exhaust flowing to the first NOx catalyst 11a, in the particular case of NOx reduction treatment for the first NOx catalyst 11a. FIG. 2 is a timing chart showing the first valve 12a open/closed timing, the first reducer-adding valve 13a ON/OFF timing, and an amount of exhaust flowing to the first NOx catalyst 11a. The horizontal axis indicates time.

To perform NOx reduction treatment for the first NOx catalyst 11a, first, the ECU 35 sends a fully-close operation command to the first valve 12a and a fully-open operation command to the second valve 12b. In so doing, a substantially total amount of exhaust passing through the exhaust pipe 5 passes through the second branch passage 10b. Accordingly, as FIG. 2 shows, after the first valve fully closes the amount of exhaust flowing to the first NOx catalyst 11a decreases and becomes substantially zero, excluding leakage from the first valve 12a.

Meanwhile, fuel that acts as a reducer is added from the first fuel-adding valve 13a to the exhaust at a time point where a predetermined delay time $\Delta T$ has passed subsequent to sending a fully-close operation command to the first valve 12a. Here in the process of decreasing the amount of exhaust flowing to the first NOx catalyst 11a, at the time point where the fuel added to the exhaust from the first fuel-adding valve 13a moves to the downstream side along with the exhaust and reaches the first NOx catalyst 11a, the amount of exhaust becomes substantially zero. The delay time $\Delta T$ is set such that when the amount of exhaust becomes substantially zero, the fuel that acts as a reducer disperses in the first NOx catalyst 11a.

During the period in which the reducer is dispersing in the first NOx catalyst 11a, NOx within the first NOx catalyst 11a is reduced. After the subsequent passage of a predetermined time, the ECU 35 sends a fully-open operation command to the first valve 12a, and the fully-open operation command for the second valve 12b is canceled. Accordingly, the amount of exhaust flowing to the first NOx catalyst 11a starts to increase and reaches a value equivalent to that before NOx reduction treatment was performed.

In this case, a period from the point at which the first valve 12a achieves a fully-closed state and the amount of exhaust flowing to the first NOx catalyst 11a becomes substantially zero, up to the point at which the operation to fully open the first valve 12a is started and the amount of exhaust flowing to the first NOx catalyst 11a starts to increase is called a "flow stop period".

For the above NOx reduction treatment, in cases with variations in the operating state of the internal combustion engine 1, the speed at which the first valve 12a closes, and the delay time $\Delta T$, the fuel added from the first reducer-adding valve 13a may not evenly disperse throughout the first NOx catalyst 11a once the amount of exhaust flowing to the first NOx catalyst 11a reaches substantially zero. In such cases, the fuel added from the first reducer-adding valve 13a may disperse in a state biased toward an upstream-side portion or a downstream-side portion in the first NOx catalyst 11a. For example, if the delay time $\Delta T$ is too short, then the fuel added from the first reducer-adding valve 13a travels a longer distance before the flow stop period. The fuel therefore disperses biased toward a downstream-side portion in the first NOx catalyst 11a at the time point where the flow stop period starts. Alternatively, if the delay time $\Delta T$ is too long, then the fuel added from the first reducer-adding valve 13a travels a shorter distance before the flow stop period. The fuel therefore disperses biased toward an upstream-side portion in the first NOx catalyst 11a. Accordingly, there were cases in which NOx stored throughout the entire first NOx catalyst 11a could not be sufficiently reduced.

As described above, it is clear here that in cases where the fuel added from the first reducer-adding valve 13a disperses biased toward an upstream-side portion in the first NOx catalyst 11a during the flow stop period, the air-fuel ratio upstream of the first NOx catalyst 11a becomes lower than the air-fuel ratio downstream. Similarly, it is also clear that in cases where the fuel added from the first reducer-adding valve 13a disperses biased toward a downstream-side portion in the first NOx catalyst 11a, the air-fuel ratio downstream of the first NOx catalyst 11a becomes lower than the air-fuel ratio upstream.

Figure 3A:
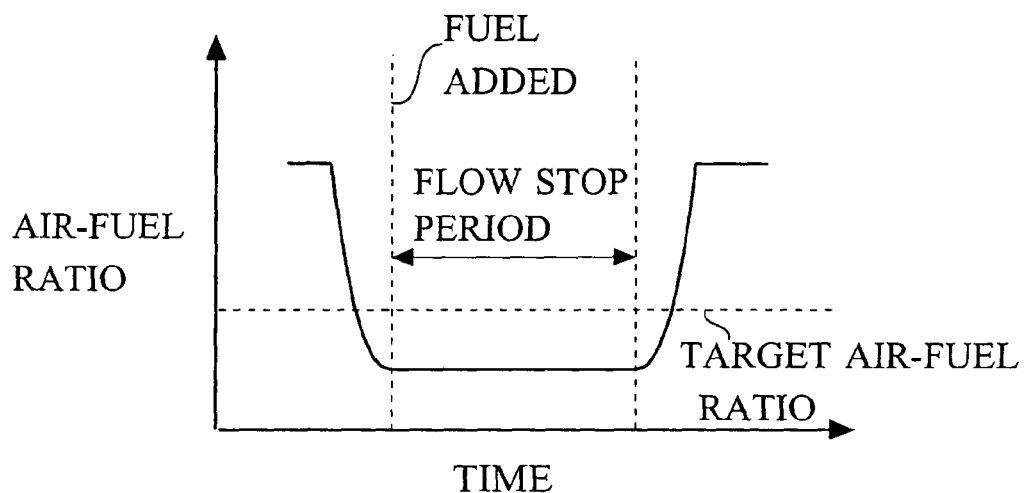
FIG. 3A is a graph showing changes in an air-fuel ratio upstream of the first NOx catalyst in a case where fuel added from the first reducer-adding valve is dispersed biased toward an upstream-side portion in the first NOx catalyst.
Figure 3B:
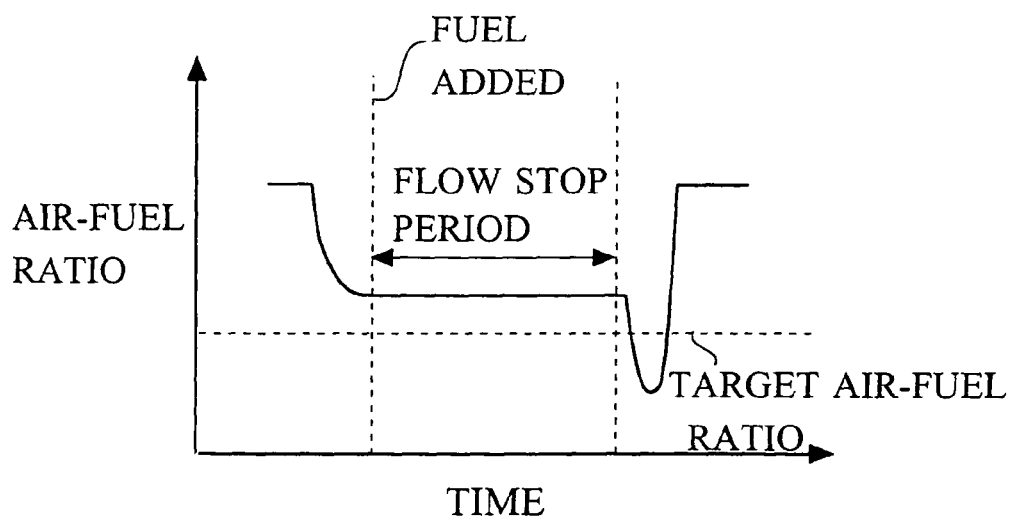
FIG. 3B is a graph showing changes in the air-fuel ratio downstream of the first NOx catalyst for the same case.

These phenomena will be explained with reference to FIG. 3. FIG. 3A is a graph showing changes in the air-fuel ratio upstream of the first NOx catalyst 11a in a case where the fuel added from the first reducer-adding valve 13a is dispersed biased toward an upstream-side portion in the first NOx catalyst 11a. FIG. 3B is a graph showing changes in the air-fuel ratio downstream of the first NOx catalyst 11a for the same case.

In the graphs of FIGS. 3A and 3B, the vertical axes indicate the air-fuel ratio and the horizontal axes indicate a general time for the NOx reduction treatment from start to end. An air-fuel ratio value required for the NOx reduction treatment is indicated by a broken line as a target air-fuel ratio. As evident from FIG. 3A, when the fuel added from the first reducer-adding valve 13a disperses biased toward an upstream-side portion in the first NOx catalyst 11a, the air-fuel ratio upstream of the first NOx catalyst 11a becomes lower than the target air-fuel ratio over substantially the entire flow stop period. However, this phenomenon is caused by the continued extremely low state of the air-fuel ratio upstream of the first NOx catalyst 11a, as the fuel added from the first reducer-adding valve 13a disperses biased toward an upstream-side portion in the first NOx catalyst 11a at the time point where the amount of exhaust flowing to the first NOx catalyst becomes substantially zero.

Likewise as shown in FIG. 3B, in the same case, the air-fuel ratio downstream of the first NOx catalyst 11a becomes higher than the target air-fuel ratio over substantially the entire flow stop period. Subsequent to the end of the flow stop period, the air-fuel ratio downstream of the first NOx catalyst 11a temporarily experiences a sharp drop and an immediate recovery thereafter. This phenomenon is caused by the following. The fuel added from the first reducer-adding valve 13a disperses biased toward an upstream-side portion in the first NOx catalyst 11a over the entire flow stop period, and almost no fuel disperses toward downstream of the first NOx catalyst 11a. For this reason, the air-fuel ratio downstream of the first NOx catalyst 11a continues to be in a higher state than the target value. Once the flow stop period ends, the fuel dispersed toward the upstream-side portion in the first NOx catalyst 11a passes downstream of the first NOx catalyst 11a.

Figure 4A:
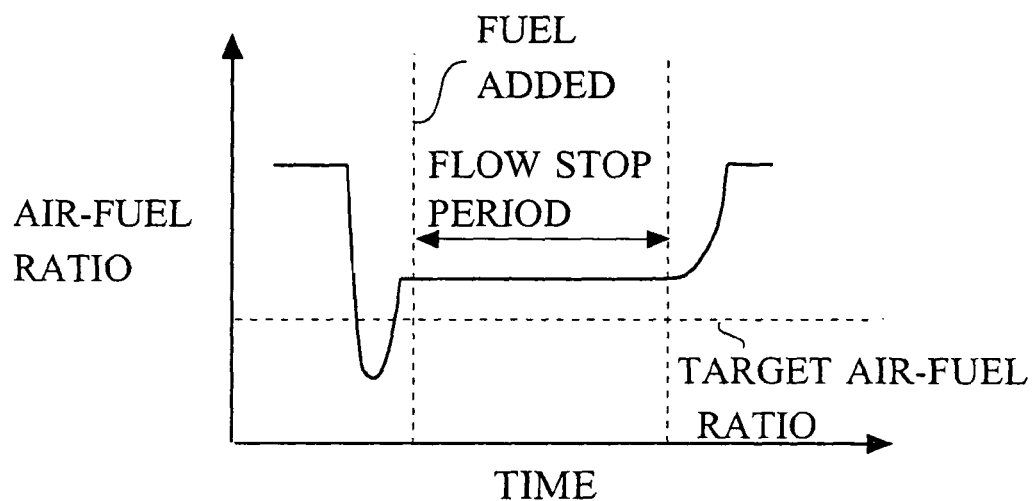
FIG. 4A is a graph showing changes in the air-fuel ratio upstream of the first NOx catalyst in a case where fuel added from the first reducer-adding valve is dispersed biased toward a downstream-side portion in the first NOx catalyst.
Figure 4B:
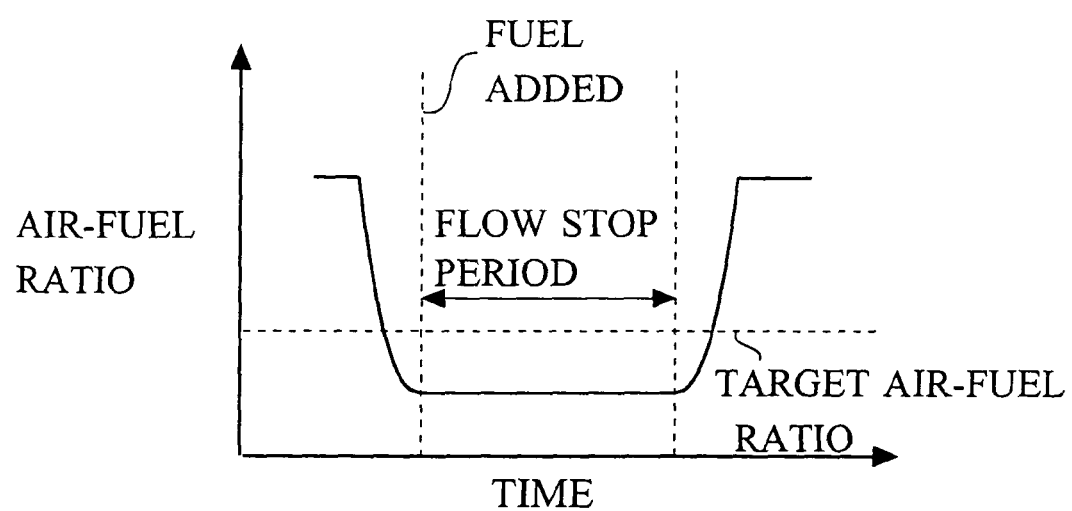
FIG. 4B is a graph showing changes in the air-fuel ratio downstream of the first NOx catalyst for the same case.

FIG. 4 will be explained next. FIG. 4A is a graph showing changes in the air-fuel ratio upstream of the first NOx catalyst 11a in a case where fuel added from the first reducer-adding valve 13a is dispersed biased toward a downstream-side portion in the first NOx catalyst 11a. FIG. 4B is a graph showing changes in the air-fuel ratio downstream of the first NOx catalyst 11a for the same case.

As evident from FIG. 4A, when the fuel added from the first reducer-adding valve 13a disperses biased toward a downstream-side portion in the first NOx catalyst 11a, the air-fuel ratio upstream of the first NOx catalyst 11a temporarily becomes extremely low prior to the flow stop period, after which the air-fuel ratio continues to be in a higher state than the target air-fuel ratio substantially over the entire flow stop period. This phenomenon is due to not much fuel dispersing to upstream of the first NOx catalyst 11a for the following reason. The fuel added from the first reducer-adding valve 13a passes upstream of the first NOx catalyst 11a prior to the flow stop period, and travels to a downstream-side portion in the first NOx catalyst 11a, and during the flow stop period the fuel disperses biased toward the downstream-side portion in the first NOx catalyst 11a.

Likewise as shown in FIG. 4B, in the same case, the air-fuel ratio downstream of the first NOx catalyst 11a becomes lower than the target air-fuel ratio over the entire flow stop period. This phenomenon is caused by the fuel added from the first reducer-adding valve 13a dispersing biased toward a downstream-portion in the first NOx catalyst 11a over the entire flow stop period.

According to the present invention, as described above, using the air-fuel ratio characteristics of the upstream side and the downstream side of the first NOx catalyst 11a, the air-fuel ratios upstream and downstream of the first NOx catalyst 11a are detected by the upstream-side air-fuel ratio sensor 14a and the downstream-side air-fuel ratio sensor 15a. The delay time $\Delta T$ is accordingly changed such that the difference between both detected values during the flow stop period becomes zero. Consequently, the fuel added from the first reducer-adding valve 13a becomes evenly dispersed in the first NOx catalyst 11a.

FIG. 5 is a NOx reduction treatment routine according to the present embodiment. The present routine is a program stored in the ROM of the ECU 35, and is performed when a NOx reduction treatment start condition is met. The NOx reduction treatment start condition may be specified as met when an operating time of the internal combustion engine 1 or a vehicle travel distance exceeds a threshold value following a previous NOx reduction treatment. The condition may also be specified as met when a NOx concentration detected downstream of the first NOx catalyst 11a exceeds a threshold value.

When the present routine is performed, first at S101 the ECU 35 sends a fully-close operation command to the first valve 12a, and sends a fully-open operation command to the second valve 12b. The close operation of the first valve 12a and the open operation of the second valve 12b are started at this time point. The amount of exhaust flowing to the first NOx catalyst 11a accordingly begins to decrease. Once the processing at S101 ends, the routine proceeds to the processing at S102.

At S102, fuel that acts as a reducer in exhaust passing through the first branch passage 10a is added from the first reducer-adding valve 13a. More specifically, after the fully-close operation command is sent to the first valve 12a and the fully-open operation command is sent to the second valve 12b, the addition of fuel is started following passage of the delay time $\Delta T$. The delay time $\Delta T$ uses a value that adds a correction value $\Delta T'$, which was derived in processing to be described later when the present routine was previously performed, to a reference delay time $\Delta TS$, which was empirically found in advance. Also, an added fuel amount F at this time similarly uses a value that adds a correction value F', which was derived in processing to be described later when the present routine was previously performed, to a reference added fuel amount FS, which was empirically used beforehand. Once the processing at S102 ends, the routine proceeds to the processing at S103.

At S103, the air-fuel ratios upstream and downstream of the first NOx catalyst 11a are detected. More specifically, these are detected by inputting to the ECU 35 an output value AFU of the first upstream-side air-fuel ratio sensor 14*a* and an output value AFL of the first downstream-side air-fuel ratio sensor 15*a*.

The routine next proceeds to S104, where it is determined whether an absolute value of the difference between AFU and AFL detected at S103 is equal to or less than a predetermined air-fuel ratio difference value AFS. The air-fuel ratio difference value AFS here is a value that is empirically found in advance. The air-fuel ratio difference value AFS is also a difference value that acts as a threshold value enabling a determination where, if the absolute value of the difference between the air-fuel ratios upstream and downstream of the NOx catalyst is equal to or less than this value, the fuel added from the reducer-adding valve is mainly dispersing to a central portion of the NOx catalyst during the flow stop period.

If it is determined here that the absolute value of the difference between AFU and AFL is greater than AFS, then it can be determined that the fuel added from the first reducer-adding valve 13*a* is not dispersing toward a central portion in the first NOx catalyst 11*a*, and is instead dispersing biased toward an upstream-side portion or a downstream-side portion. Therefore, the routine proceeds to S105 in order to correct the delay time ΔT. Meanwhile, if it is determined that the absolute value of the difference between AFU and AFL is equal to or less than AFS, then it can be determined that the fuel added from the first reducer-adding valve 13*a* is dispersing toward a central portion in the first NOx catalyst 11*a*. Therefore, the routine proceeds to S106 without correcting the delay time ΔT.

Here, if the difference between AFU and AFL calculated at S104 is a positive value, i.e., if AFU is a greater value than AFL, it is determined that the fuel is dispersing biased toward a downstream-side portion in the first NOx catalyst 11*a*. If AFU is a smaller value than AFL, it is determined that the fuel is dispersing biased toward an upstream-side portion in the first NOx catalyst 11*a*.

In such case, the delay time ΔT must be changed so that the fuel disperses toward a central portion in the first NOx catalyst 11*a*. Thus at S105, the correction value ΔT' is derived in order to change the delay time ΔT. More specifically, the delay time ΔT is set so as to be calculated by adding the correction value ΔT' to the reference delay time ΔTS. A map is also set in advance regarding the relationship between the difference value of AFU and AFL, and the correction value ΔT' of the delay time for making the difference between AFU and AFL zero with respect to the difference value. A value for the correction value ΔT', which corresponds to the difference value between AFU and AFL calculated at S104, is thus derived by reading out from the above-mentioned map. The routine proceeds to S106 if the processing at S105 ends, and if it is determined that the absolute value of the difference between AFU and AFL at S104 is equal to or less than AFS.

At S106, it is determined whether an absolute value of the deviation between an average value of AFU and AFL detected at S103, and the target air-fuel ratio AFT for the NOx reduction treatment of the first NOx catalyst 11*a*, is equal to or less than a predetermined target air-fuel ratio deviation AFD. The target air-fuel ratio deviation AFD here is a value that is empirically found in advance. The target air-fuel ratio deviation AFD is also a deviation value that acts as a threshold value enabling a determination where, if the absolute value of the deviation between the average value of the air-fuel ratios upstream and downstream of the NOx catalyst and the target air-fuel ratio is equal to or less than this value, then the NOx reduction treatment is being performed well.

If it is determined here that the absolute value of the deviation between the target air-fuel ratio AFT and the average value of AFU and AFL is greater than AFD, then it can be determined that the amount of fuel added from the first reducer-adding valve 13*a* is excessively small or large, and that the NOx reduction treatment for the first NOx catalyst 11*a* is not being performed well. Therefore, the routine proceeds to S107 in order to correct the added fuel amount F. Meanwhile, if it is determined that the absolute value of the deviation between target air-fuel ratio AFT and the average value of AFU and AFL is equal to or less than AFD, then it can be determined that the amount of fuel added from the first reducer-adding valve 13*a* is appropriate. Therefore, the routine proceeds to S108 without correcting the added fuel amount F.

At S107, as described above, the correction value F' is derived in order to correct the added fuel amount F. More specifically, the added fuel amount F is set so as to be calculated by adding the correction value F' to the reference added fuel amount FS. A map is also set in advance regarding the relationship between the deviation in the target air-fuel ratio AFT and the average value of AFU and AFL, and the correction value F' for setting the average value of AFU and AFL to the target air-fuel ratio AFT with respect to the deviation. A value for the correction value F', which corresponds to the deviation between the target air-fuel ratio AFT and the average value of AFU and AFL calculated at S106, is thus derived by reading out from the above-mentioned map. The routine proceeds to S108 if the processing at S107 ends, and if it is determined that the absolute value of the deviation between the target air-fuel ratio AFT and the average value AFU and AFL at S106 is equal to or less than AFD.

At S108, a new delay time ΔT is calculated by adding the correction value ΔT' derived at S105 to the reference delay time ΔTS. Similarly, a new added fuel amount F is calculated by adding the correction value F' derived at S107 to the reference added fuel amount FS. Once the processing at S108 ends, the present routine is ended.

Thus as described above, according to the NOx reduction treatment routine of the present embodiment, if the absolute value of the difference between the output value AFU of the first upstream-side air-fuel ratio sensor 14*a* and the output value AFL of the first downstream-side air-fuel ratio sensor 15*a* is greater than the air-fuel ratio difference value AFS, then the delay time ΔT is changed in order to zero the difference between the output value AFU of the first upstream-side air-fuel ratio sensor 14*a* and the output value AFL of the first downstream-side air-fuel ratio sensor 15*a*. Therefore, the delay time ΔT when fuel is next added from the first reducer-adding valve 13*a* is changed, and fuel can be dispersed at a central portion in the first NOx catalyst 11*a* during the next flow stop period.

If the absolute value of the deviation between the target air-fuel ratio AFT and the average value of the output value AFU of the first upstream-side air-fuel ratio sensor 14*a* and the output value AFL of the first downstream-side air-fuel ratio sensor 15*a* is greater than the target air-fuel ratio deviation AFD, then the added fuel amount F is changed in order to zero the deviation between the target air-fuel ratio AFT and the average value of the output value AFU of the first upstream-side air-fuel ratio sensor 14*a* and the output value AFL of the first downstream-side air-fuel ratio sensor 15*a*. Therefore, the added fuel amount F when fuel is next added from the reducer-adding valve 13*a* is changed, and an appropriate amount of fuel is added for performing the NOx reduction treatment in the first NOx catalyst 11a. Thus, the NOx reduction treatment can be more reliably performed in the first NOx catalyst 11a.

Note that an example was explained in the present embodiment where, NOx reduction treatment was performed for the first NOx catalyst 11a following output of the fully-close operation command to the first valve 12a and the fully-open operation command to the second valve 12b for performing the NOx reduction treatment. However, when performing NOx reduction treatment for the second NOx catalyst 11b following output of the fully-open operation command to the first valve 12a and the fully-close operation command to the second valve 12b, the same control may also be performed using the second reducer-adding valve 13b, the second upstream-side air-fuel ratio sensor 14b, and the second downstream-side air-fuel ratio sensor 15b. Thus, the NOx reduction treatment can be more reliably performed in the second NOx catalyst 11b. In the following description as well, an example is explained where the NOx reduction treatment is only performed for the first NOx catalyst 11a; however, the same control may be applied when performing the NOx reduction treatment for the second NOx catalyst 11b.

In addition, according to the above NOx reduction treatment routine, a control is performed so as to zero the deviation between the target air-fuel ratio AFT and the average value of the output value AFU of the first upstream-side air-fuel ratio sensor 14a and the output value AFL of the first downstream-side air-fuel ratio sensor 15a. However, separate target air-fuel ratios (such as AFT1 and AFT2) may be respectively set for the output value AFU of the first upstream-side air-fuel ratio sensor 14a and the output value AFL of the first downstream-side air-fuel ratio sensor 15a. A control may then be performed so as to respectively zero the deviation between AFU and AFT1, and the deviation between AFL and AFT2.

Furthermore, according to the present embodiment, the flow stop period is a period where the amount of exhaust flowing to the first NOx catalyst 11a is substantially zero. However, commencement of the flow stop period may be set as the time point when the ECU 35 sends the fully-close operation command to the first valve 12a and the fully-open operation command to the second valve 12b, up to the time point where an exhaust amount-reducing period TD, which is a constant value empirically calculated in advance, has passed.

After fuel is added from the first reducer-adding valve 13a, the output signal of the first upstream-side air-fuel ratio sensor 14a experiences a sharp decrease followed by a recovery and subsequent stable state. Alternatively, commencement of the flow stop period may be determined when the output signal of the first upstream-side air-fuel ratio sensor 14a become stable after the decrease followed by a recovery. As explained earlier, this is based on the following consideration: the output of the first upstream-side air-fuel ratio sensor 14a is not stable and continues to change while the exhaust including the fuel added from the first reducer-adding valve 13a is moving in the first branch passage 10a, and becomes stable at the time point where the amount of exhaust flowing to the first NOx catalyst 11a, i.e., the flow amount of exhaust including the fuel added from the first reducer-adding valve 13a, is substantially zero.

More specifically, following a sharp decrease in the output signal of the first upstream-side air-fuel ratio sensor 14a, the time until the output signal recovers and becomes stable is measured. The exhaust amount-reducing period TD may then be corrected based on the measurement result.

FIG. 6 shows an exhaust amount-reducing period correction routine according to the present embodiment. The present routine, for example, is a routine that is simultaneously performed when the NOx reduction treatment routine shown in FIG. 5 for the first NOx catalyst 11a is performed.

When performing the present routine, first, it is determined at S201 whether the fully-close operation of the first valve 12a has started. More specifically, it is determined whether the ECU 35 has sent the fully-close operation command for the first valve 12a. If it is determined here that the fully-close operation of the first valve 12a has not been started, then the present routine ends. However, if it is determined that the fully-close operation of the first valve 12a has started, then the routine proceeds to S202.

At S202, the value of an exhaust amount-reducing period correction value TD' for changing the exhaust amount-reducing period TD is incrementally increased. Once the processing at S202 ends, the routine proceeds to the processing at S203.

At S203, it is determined whether the absolute value of a value dAFU/dT indicating the change in the output signal AFU of the first upstream-side air-fuel ratio sensor 14a is equal to or less than a reference change amount. Here, the AFU value may be obtained by the ECU 35 newly reading the output signal of the first upstream-side air-fuel ratio sensor 14a in the processing of the present routine, or by using the most recent detection value that is detected at S103 in FIG. 5. When calculating the value for dAFU/dT, the value may be obtained by dividing the difference between the currently obtained AFU value and the AFU value obtained in the previous execution of the present routine by timing intervals between executions of the present routine. Furthermore, the reference change amount here refers to a value of change in AFU that acts as a threshold capable of determining that the output signal of the first upstream-side air-fuel ratio sensor 14a is stable, i.e., that the amount of exhaust flowing to the first NOx catalyst 11a is substantially zero, when the absolute value of dAFU/dT is equal to or less than the reference change amount.

If it is determined at S203 that the absolute value of dAFU/dT is greater than the reference change amount, then it can be determined that the output signal of the first upstream-side air-fuel ratio sensor 14a is not stable. Therefore, the routine returns to the processing at S202, where the exhaust amount-reducing period correction value TD' is incrementally increased again. The processing at S202 and S203 is repeatedly performed until it is determined at S203 that the absolute value of dAFU/dT is equal to or less than the reference change amount.

If it is determined at S203 that the absolute value of dAFU/dT is equal to or less than the reference change amount, then it can be determined that the output of the first upstream-side air-fuel ratio sensor 13a is stable. Therefore, the routine proceeds to the processing at S204.

At S204, it is determined whether the AFU value is equal to or less than a reference air-fuel ratio value. Such processing is included in order to avoid a determination that the flow stop period is commencing based on stable output of the first upstream-side air-fuel ratio sensor 14a in a state prior to passage of the fuel added from the first reducer-adding valve 13a. The reference air-fuel ratio value here refers to a value of the air-fuel ratio that acts as a threshold capable of determining a state prior to the fuel added from the first reducer-adding valve 13a passing near the first upstream-side air-fuel ratio sensor 14a, when AFU is a value greater than the reference air-fuel ratio value.

If it is determined at S204 that the AFU value is greater than the reference air-fuel ratio value, then a determination can be made of a state prior to passage of the fuel added from the first reducer-adding valve 13a. Therefore, even if the absolute value of dAFU/dT is equal to or less than the reference change amount, it is still determined that the output of the first upstream-side air-fuel ratio sensor 13a is not stable, and the routine returns to the processing at S202.

However, if it is determined at S204 that the AFU value is equal to or less than the reference air-fuel ratio value, then a determination can be made of a state where the absolute value of dAFU/dT is equal to or less than the reference change amount after the fuel added from the first reducer-adding valve 13a has passed. Therefore, the routine proceeds to the processing at S205.

At S205, the value for the exhaust amount-reducing period correction value TD' at this time is stored as the exhaust amount-reducing period TD. Once the processing at S205 ends, the routine proceeds to the processing at S206.

At S206, the value for the exhaust amount-reducing period correction value TD' is reset, and the present routine is ended.

Thus, according to the present embodiment, commencement of the flow stop period is defined as the time point when the exhaust amount-reducing period TD has passed from the start of the fully-close operation of the first valve 12a. Furthermore, the value for the exhaust amount-reducing period TD is constantly corrected so as to coincide with a period following the adding of the fuel from the first reducer-adding valve 13a until the output of the first upstream-side air-fuel ratio sensor 14a is stable. Consequently, commencement of the flow stop period can be more precisely determined as a period where the amount of exhaust flowing to the first NOx catalyst 11a is substantially zero.

It should be noted for the above embodiment, a configuration was described in which the first branch passage 10a is provided with the first NOx catalyst 11a, and the second branch passage 10b is provided with the second NOx catalyst 11b. However, a configuration is also possible in which, for example, a first oxidation catalyst is provided between the first NOx catalyst 11a and the first upstream-side air-fuel ratio sensor 14a, and a second oxidation catalyst is provided between the second NOx catalyst 11b and the second upstream-side air-fuel ratio sensor 14b.

In addition, according to the above embodiment, a bias in the dispersion of the fuel in the first NOx catalyst 11a is estimated by detecting a difference between the output value AFU of the first upstream-side air-fuel ratio sensor 14a and the output value AFL of the first downstream-side air-fuel ratio sensor 15a during the flow stop period. As shown in FIGS. 3 and 4, this may also be estimated from a difference in waveforms on a graph for the output of the first upstream-side air-fuel ratio sensor 14a and the output of the first downstream-side air-fuel ratio sensor 15a.

For example, the added fuel may be estimated as dispersing biased toward an upstream-side portion in the first NOx catalyst 11a if the time for which the air-fuel ratio upstream of the first NOx catalyst 11a is equal to or less than the target air-fuel ratio is longer than the time for which the air-fuel ratio downstream of the first NOx catalyst 11a is equal to or less than the target air-fuel ratio. Alternatively, the added fuel may be estimated as dispersing biased toward a downstream-side portion in the first NOx catalyst 11a if the time for which the air-fuel ratio upstream of the first NOx catalyst 11a is equal to or less than the target air-fuel ratio is shorter than the time for which the air-fuel ratio downstream of the first NOx catalyst 11a is equal to or less than the target air-fuel ratio.

As an additional example, the added fuel may be estimated as dispersing biased toward an upstream-side portion in the first NOx catalyst 11a if a sharp downward peak appears in the graph of the air-fuel ratio upstream of the first NOx catalyst 11a. Alternatively, the added fuel may be estimated as dispersing biased toward a downstream-side portion in the first NOx catalyst 11a if a sharp downward peak appears in the graph of the air-fuel ratio downstream of the first NOx catalyst 11a.

SECOND EMBODIMENT

Next, a second embodiment according to the present invention will be described. For the second embodiment, it is assumed that the value of the added fuel amount F, which is added from the first fuel-adding valve 13a, is preset to a constant value. A control will be described below that determines during the NOx reduction treatment explained in the first embodiment that the fuel added from the first fuel-adding valve 13a is excessively dispersing concentrated at a central portion in the first NOx catalyst 11a, and not dispersing toward portions on the upstream side and downstream side in the first NOx catalyst 11a. Such a determination is made instead determining that the added fuel amount F from the first fuel-adding valve 13a has deviated from an optimum value. In addition, such a determination is made if the absolute value of the deviation between the target air-fuel ratio AFT and the average value of the output AFT of the first upstream-side air-fuel ratio sensor 14a and the output AFL of the first downstream-side air-fuel ratio sensor 15a is greater than the target air-fuel ratio deviation AFD.

FIG. 7 shows the NOx reduction treatment routine according to the present embodiment. The present routine and the NOx reduction treatment routine shown in FIG. 5 differ only in the processing at S301, S302, and S303. Therefore, only this processing will be explained.

S301 is similar to the first embodiment at S101, where the fully-close operation command is sent to the first valve 12a and the fully-open operation command is sent to the second valve 12b. Following this, the adding of fuel from the first reducer-adding valve 13a is started after the delay time ΔT has passed. However, in the present embodiment, correction for the amount F of the fuel added at this time is not performed, and a preset constant amount of fuel is added instead. According to the present embodiment, a value to be determined in later processing of the present routine is used as an N value so as to add the fuel over the course of a frequency of N times.

At S302, if it is determined that the absolute value of the deviation between the target air-fuel ratio AFT and the average value of AFU and AFL at S106 is greater than the target air-fuel ratio deviation AFD, then a correction value N' for correcting the fuel-adding frequency N in S301 is derived, instead of deriving the correction value F' for correcting the added fuel amount F as in the first embodiment. More specifically, a map is set in advance for the relationship regarding the deviation between the target air-fuel ratio AFT and the average value of AFU and AFL, and the correction value N' required for setting the average value of AFU and AFL to the target air-fuel ratio AFT with respect to the deviation. By reading out from the above map, a value is derived for the correction value N', which corresponds to the deviation between the target air-fuel ratio AFT and the average value of AFU and AFL calculated at S106.

At S303, a new delay time ΔT is calculated by adding the correction value ΔT' derived at S105 to the reference delay time ΔTS. In addition, a new fuel-adding frequency N is determined by replacing the fuel-adding frequency N used in the processing at S301 with the fuel-adding frequency correction value N' derived at S302. Once the processing at S303 ends, the present routine is ended.

As described above, according to the present embodiment, if it is determined at S106 that the absolute value of the deviation between the target air-fuel ratio AFT and the average value of AFU and AFL is greater than the target air-fuel ratio deviation AFD, then it can also be determined that the fuel added from the first reducer-adding valve 13a is excessively dispersing concentrated at a central portion in the first NOx catalyst 11a, and not dispersing toward portions on the upstream side and downstream side in the first NOx catalyst 11a. By adding the same amount of fuel over the course of an optimum frequency, the fuel can be evenly dispersed throughout the entire area of the first NOx catalyst 11a. Thus, the NOx reduction treatment can be more reliably performed over the entire first NOx catalyst 11a.

Figure 8A:
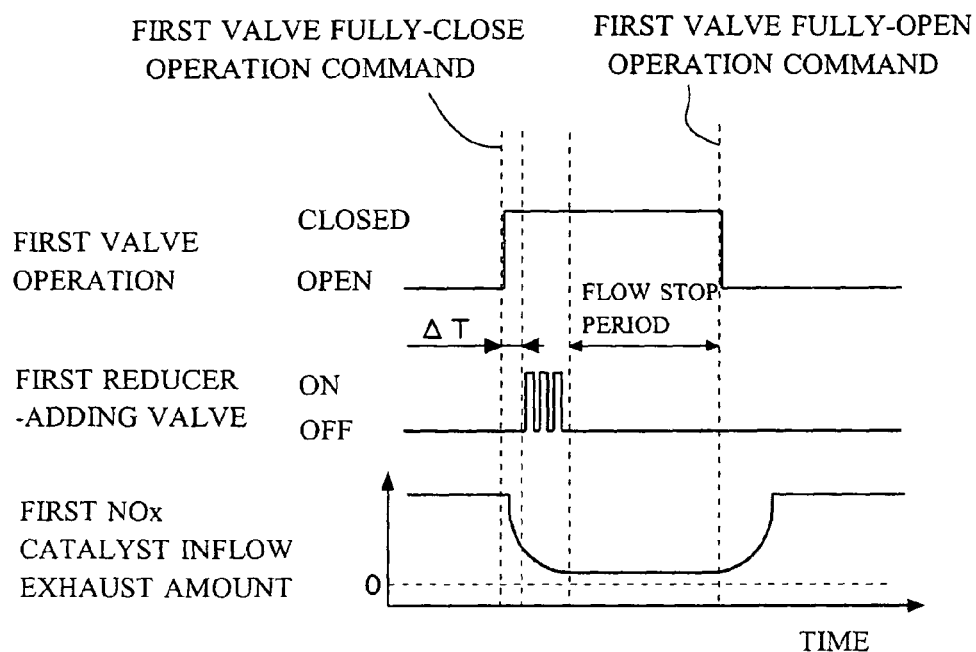
FIGS. 8A and 8B are timing charts showing the first valve open/closed timing, the first reducer-adding valve ON/OFF timing, and the amount of exhaust flowing to the first NOx catalyst according to the second embodiment of the present invention.
Figure 8B:
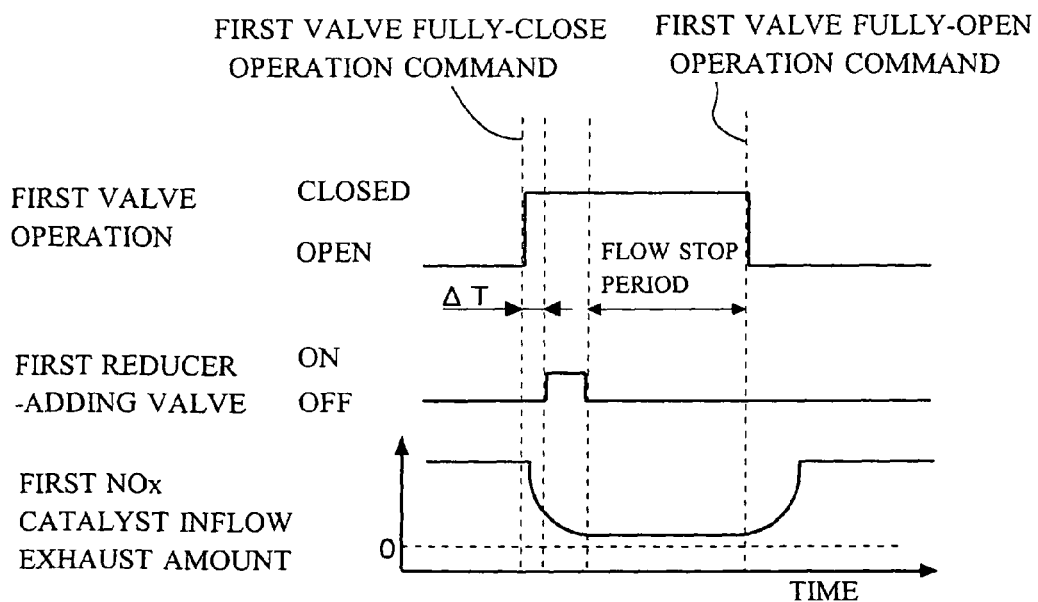

FIGS. 8A and 8B show an example of timing charts for the first valve 12a open/closed timing, the first reducer-adding valve 13a ON/OFF timing, and the amount of exhaust flowing to the first NOx catalyst 11a, which are different from those shown in FIG. 2. FIG. 8A is a timing chart for the present embodiment described above. Subsequent to passage of the delay time $\Delta T$ following the start of the fully-close operation of the first valve 12a, fuel is added from the first reducer-adding valve 13a multiple times in an amount corresponding to the preset added fuel amount F.

Note that in order to evenly disperse fuel added from the first reducer-adding valve 13a through the first NOx catalyst 11a, a fuel injection timing and a fuel-adding rate when adding fuel from the first reducer-adding valve 13a may be changed as shown in FIG. 8B, instead of increasing the frequency at which fuel is added from the first reducer-adding valve 13a as performed in the present embodiment. The fuel-adding rate here means an amount of fuel added per a unit of time. In this case, fuel can be evenly dispersed in the first NOx catalyst 11a by adding the same amount of fuel at a small fuel-adding rate over a long period of time.

THIRD EMBODIMENT

Next, a third embodiment according to the present invention will be described. The third embodiment is an example where a plurality of NOx catalysts is provided in series in the first branch passage 10a and the second branch passage 10b. The following description regards performing the NOx reduction treatment for the NOx catalysts provided in, for example, the first branch passage 10a. In this example, a target value of a difference between the output signals of the first upstream-side air-fuel ratio sensor 14a and the first downstream-side air-fuel ratio sensor 15a is set in accordance with an amount of reducer required for each NOx catalyst.

Figure 9:
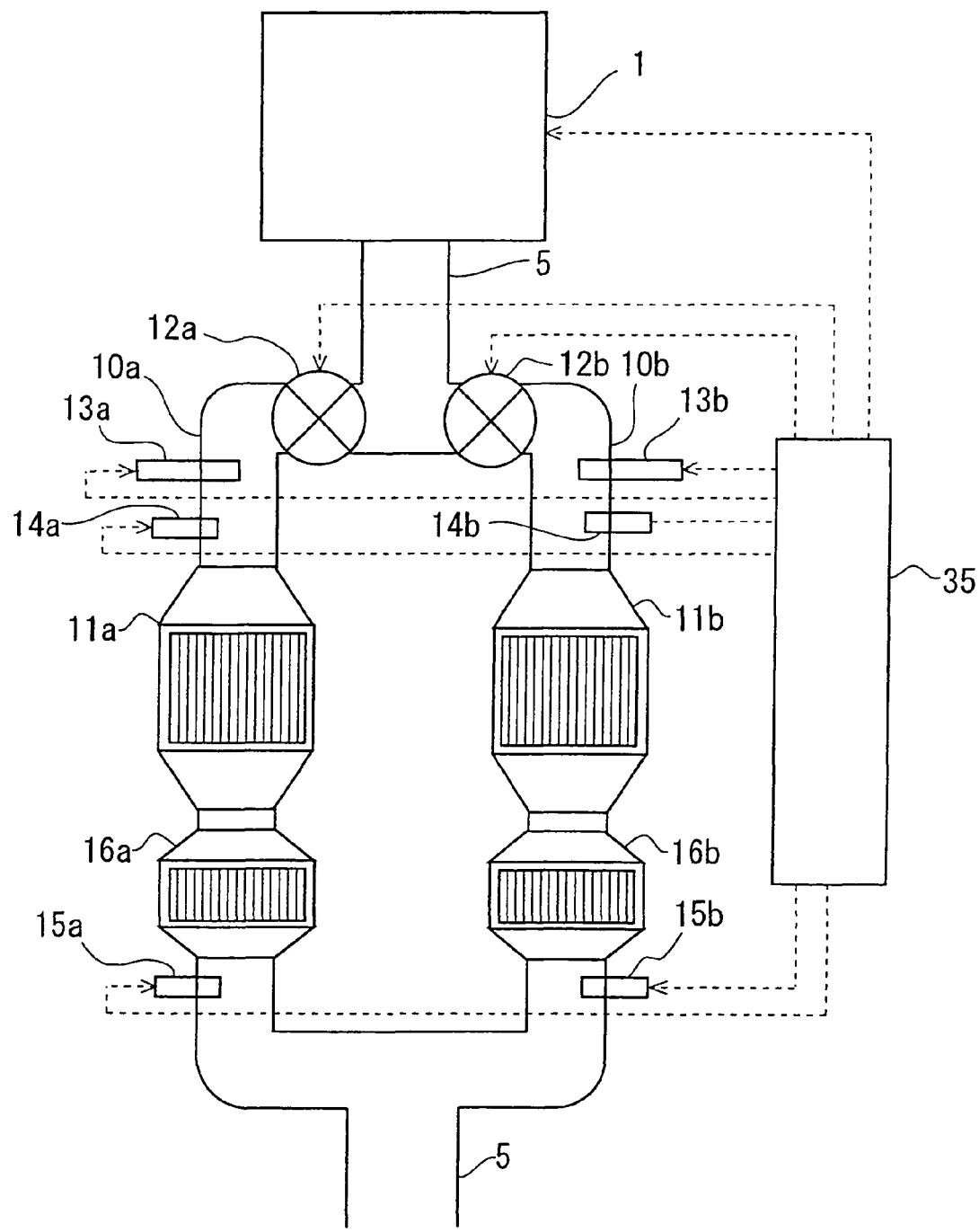
FIG. 9 is a view showing a schematic configuration of the internal combustion engine, and the exhaust system and the control system thereof, according to a third embodiment of the present invention.

FIG. 9 shows a schematic configuration of the internal combustion engine 1, and the exhaust system and the control system thereof, according to the present embodiment. FIG. 9 is different from FIG. 1 in that: a first downstream-side NOx catalyst 16a, which is an auxiliary storage-reduction type NOx catalyst, is provided between the first NOx catalyst 11a and the first downstream-side air-fuel ratio sensor 15a in the first branch passage 10a; and likewise, a second downstream-side NOx catalyst 16b is provided between the second NOx catalyst 11b and the second downstream-side air-fuel ratio sensor 15a in the second branch passage 10b.

In this case, the output AFU of the first upstream-side air-fuel ratio sensor 14a decreases as the fuel added from the first fuel-adding valve 13a during the flow stop period disperses to the upstream side of an area between the first upstream-side air-fuel ratio sensor 14a and the first downstream-side air-fuel ratio sensor 15a. At the same time, the output AFL of the first downstream-side air-fuel ratio sensor 15a increases. On the other hand, as dispersion to the downstream side increases, the output AFU of the first upstream-side air-fuel ratio sensor 14a increase, and the output AFL of the first downstream-side air-fuel ratio sensor 15a decreases. In other words, it is possible to control a dispersion amount of the fuel in the NOx catalysts during the flow stop period by changing the delay time $\Delta T$, so that the difference between the AFU value and the AFL value reaches a desired value during the flow stop period.

Thus in the present embodiment, when performing the NOx reduction treatment, a target value is set in order to control the difference between the AFU value and the AFL value in accordance with the amount of reducer required for each NOx catalyst.

For example, in such cases where the amount of reducer required in the NOx reduction treatment for the first NOx catalyst 11a is a larger amount than that required in the NOx reduction treatment for the first downstream-side NOx catalyst 16a, the target value for the difference between the AFU value and the AFL value is set such that the center of fuel dispersion during the flow stop period is positioned on the first NOx catalyst 11a side. In so doing, optimum NOx reduction can be achieved for both the first NOx catalyst 11a and the first downstream-side NOx catalyst 16a.

FIG. 10 shows the NOx reduction treatment routine according to the present embodiment. The NOx reduction treatment routine according to the present embodiment and that shown in FIG. 5 differ only in the processing at S401 and S402. Therefore, only this processing will be explained.

In the NOx reduction treatment routine shown in FIG. 5, it is determined at S104 whether the absolute value of the difference between AFU and AFL is equal to or less than the air-fuel ratio difference value AFS. However, at S401 in the present embodiment, it is determined whether the absolute value of the deviation between a target air-fuel ratio difference AFDT and the difference between AFU and AFL is equal to or less than the air-fuel ratio difference value AFS. That is, in the present embodiment, the target value of the difference between AFU and AFL is the target air-fuel ratio difference AFDT instead of zero. The target air-fuel ratio difference AFDT here refers to a value for the difference with which fuel is dispersed, where, during the NOx reduction treatment, if the difference between AFU and AFL is set to this value, then the amount of reducer required for both the first NOx catalyst 11a and the first downstream-side NOx catalyst 16a can be supplied. The target air-fuel ratio difference AFDT is also a value that is empirically found in advance.

If it is determined at S401 that the absolute value of the deviation between the target air-fuel ratio difference AFDT and the difference between AFU and AFL is greater than the air-fuel ratio difference value AFS, then it can be determined that the manner of fuel dispersion during the flow stop period is not following a fuel distribution enabling optimum NOx reduction of both the first NOx catalyst 11a and the first downstream-side NOx catalyst 16a, as empirically found in advance. Therefore, the routine proceeds to the processing at S402.

At S402, similar to the first embodiment, a correction value is calculated for correcting the delay time $\Delta T$. In such case, it is necessary to change the delay time $\Delta T$ so that the fuel can achieve a distribution enabling optimum NOx reduction of both the first NOx catalyst 11a and the first downstream-side NOx catalyst 16a. Therefore, the correction value $\Delta T'$ is calculated for changing the delay time $\Delta T$. More specifically, the delay time $\Delta T$ is calculated by adding the correction value ΔT' to the reference delay time ΔTS. Furthermore, a map is set in advance regarding the relationship between the deviation of the difference between AFU and AFL with respect to the target air-fuel ratio difference AFDT, and the correction value ΔT' for setting the difference between AFU and AFL to the target air-fuel ratio difference AFDT. Hence, ΔT' is derived by reading out from the above map a value for the correction value ΔT' that corresponds to the deviation of the difference between AFU and AFL with respect to the target air-fuel ratio difference AFDT, as calculated at S401.

As described above, the present embodiment provides a plurality of NOx catalysts, the first NOx catalyst 11a and the first downstream-side NOx catalyst 16a, in the first branch passage 10a. In addition, the target air-fuel ratio difference AFDT is set in order to achieve excellent NOx reduction treatment of all the NOx catalysts. The delay time ΔT is also changed such that the difference between AFU and AFL becomes the target air-fuel ratio difference AFDT. Therefore, NOx reduction treatment can always be performed well for both the first NOx catalyst 11a and the first downstream-side NOx catalyst 16a.

Note that in the present embodiment, a first target air-fuel ratio difference AFDT1 and a second target air-fuel ratio difference AFDT2 may be empirically found in advance, for example. The first target air-fuel ratio difference AFDT1 is an optimum target value of the difference between AFU and AFL in order to disperse the fuel added from the first reducer-adding valve 13a to only the first NOx catalyst 11a. The second target air-fuel ratio difference AFDT2 is an optimum target value of the difference between AFU and AFL in order to disperse the fuel to only the first downstream-side NOx catalyst 16a. To perform NOx reduction treatment for only the first NOx catalyst 11a, the target value of the difference between the AFU value and the AFL value may be set to the first target air-fuel ratio difference AFDT1; to perform NOx reduction treatment for only the first downstream-side NOx catalyst 16a, the target value of the difference between the AFU value and the AFL value may be set to the second target air-fuel ratio difference AFDT2.

By thus changing the target value of the difference between AFU and AFL, it also becomes possible to selectively perform the NOx reduction treatment for either one of the first NOx catalyst 11a and the first downstream-side NOx catalyst 16a.

The description of the present embodiment involved a case where two NOx catalysts, the first NOx catalyst 11a and the first downstream-side NOx catalyst 16a, are disposed in the first branch passage 10a. However, the number of NOx catalysts that may be disposed in the first branch passage 10a is not particularly limited to two. The same effect can be obtained with three or more NOx catalysts disposed using a control similar to that in the present embodiment.

Furthermore, in cases where one NOx catalyst is disposed in the first branch passage 10a and the NOx catalyst has a long length, it is possible to control the areas where NOx reduction treatment should be performed in the NOx catalyst by performing a control similar to that in the present embodiment.

Note that the control described in the above embodiments may also be applied to a so-called SOx poisoning recovery treatment for a storage-reduction type NOx catalyst, and a PM regeneration treatment for a filter that collects particulate matter in exhaust.

INDUSTRIAL APPLICABILITY

The present invention is applied to an exhaust purification system for an internal combustion engine which decreases an amount of exhaust flowing to a storage-reduction type NOx catalyst, and supplies a reducer to the NOx catalyst so as to reduce NOx stored in the NOx catalyst. With the present invention, the manner in which the reducer is dispersed in the NOx catalyst can be controlled to achieve more reliable execution of a NOx reduction treatment.

The invention claimed is:

1. An exhaust purification system for an internal combustion engine comprising:
    a storage-reduction type NOx catalyst that is disposed in an exhaust passage of said internal combustion engine and purifies NOx in exhaust;
    a reducer-adding unit that is disposed on an upstream side of said storage-reduction type NOx catalyst in said exhaust passage and adds a reducer to exhaust; and
    an exhaust amount-reducing unit that reduces an amount of exhaust flowing to said storage-reduction type NOx catalyst, wherein
    a reduction treatment of NOx is performed for said storage-reduction type NOx catalyst by at least said reducer-adding unit adding said reducer to exhaust while said exhaust amount-reducing unit reduces said amount of exhaust flowing to said storage-reduction type NOx catalyst, said exhaust purification system for an internal combustion engine further comprising:
    an upstream-side air-fuel ratio detecting unit that is disposed upstream of said storage-reduction type NOx catalyst in said exhaust passage and downstream of said reducer-adding unit, and that detects an air-fuel ratio of exhaust; and
    a downstream-side air-fuel ratio detecting unit that is disposed downstream of said storage-reduction type NOx catalyst in said exhaust passage, and that detects an air-fuel ratio of exhaust, wherein
    said reducer-adding unit changes a reducer-adding timing, such that a difference between an air-fuel ratio value detected by said upstream-side air-fuel ratio detecting unit and an air-fuel ratio value detected by said downstream-side air-fuel ratio detecting unit, during a predetermined period subsequent to said reducer-adding unit adding said reducer, becomes a predetermined target value.

2. The exhaust purification system for an internal combustion engine according to claim 1, wherein
    said reducer-adding unit changes a reducer-adding amount such that said air-fuel ratio value detected by said upstream-side air-fuel ratio detecting unit and said air-fuel ratio value detected by said downstream-side air-fuel ratio detecting unit, during a predetermined period subsequent to said reducer-adding unit adding said reducer when a difference between said air-fuel ratio value detected by said upstream-side air-fuel ratio detecting unit and said air-fuel ratio value detected by said downstream-side air-fuel ratio detecting unit is substantially said target value, become predetermined target air-fuel ratios.

3. The exhaust purification system for an internal combustion engine according to claim 1, wherein
    said reducer-adding unit changes a reducer-adding frequency such that said air-fuel ratio value detected by said upstream-side air-fuel ratio detecting unit and said air-fuel ratio value detected by said downstream-side air-fuel ratio detecting unit, during a predetermined period subsequent to said reducer-adding unit adding said reducer when a difference between said air-fuel ratio value detected by said upstream-side air-fuel ratio detecting unit and said air-fuel ratio value detected by said downstream-side air-fuel ratio detecting unit is substantially said target value, become predetermined target air-fuel ratios.

4. The exhaust purification system for an internal combustion engine according to claim 1, wherein
said reducer-adding unit changes a reducer-adding rate such that said air-fuel ratio value detected by said upstream-side air-fuel ratio detecting unit and said air-fuel ratio value detected by said downstream-side air-fuel ratio detecting unit, during a predetermined period subsequent to said reducer-adding unit adding said reducer when a difference between said air-fuel ratio value detected by said upstream-side air-fuel ratio detecting unit and said air-fuel ratio value detected by said downstream-side air-fuel ratio detecting unit is substantially said target value, become predetermined target air-fuel ratios.

5. The exhaust purification system for an internal combustion engine according to claim 1, wherein
a plurality of said storage-reduction type NOx catalysts are disposed in series in said exhaust passage,
said upstream-side air-fuel ratio detecting unit is disposed upstream of said plurality of said storage-reduction type NOx catalysts,
said downstream-side air-fuel ratio detecting unit is disposed downstream of said plurality of storage-reduction type NOx catalysts, and
said predetermined target value is set in accordance with an amount of said reducer required for each catalyst among said plurality of storage-reduction type NOx catalysts for NOx reduction treatment.

6. The exhaust purification system for an internal combustion engine according to claim 1, further comprising:
a bypass passage that makes the exhaust bypass said storage-reduction type NOx catalyst, wherein
said exhaust amount-reducing unit is a valve that reduces said amount of exhaust flowing to said storage-reduction type NOx catalyst by controlling an amount of exhaust passing through said bypass passage, and
said predetermined period subsequent to said reducer-adding unit adding said reducer is a flow stop period during which said amount of exhaust flowing to said storage-reduction type NOx catalyst is substantially minimized due to said valve.

7. The exhaust purification system for an internal combustion engine according to claim 6, wherein
said flow stop period is determined based on a change in said air-fuel ratio of exhaust detected by said upstream-side air-fuel ratio detecting unit being equal to or less than a predetermined change amount.

8. The exhaust purification system for an internal combustion engine according to claim 6, wherein
said reducer-adding unit changes a reducer-adding amount such that said air-fuel ratio value detected by said upstream-side air-fuel ratio detecting unit and said air-fuel ratio value detected by said downstream-side air-fuel ratio detecting unit, during a predetermined period subsequent to said reducer-adding unit adding said reducer when a difference between said air-fuel ratio value detected by said upstream-side air-fuel ratio detecting unit and said air-fuel ratio value detected by said downstream-side air-fuel ratio detecting unit is substantially said target value, become predetermined target air-fuel ratios.

9. The exhaust purification system for an internal combustion engine according to claim 6, wherein
said reducer-adding unit changes a reducer-adding frequency such that said air-fuel ratio value detected by said upstream-side air-fuel ratio detecting unit and said air-fuel ratio value detected by said downstream-side air-fuel ratio detecting unit, during a predetermined period subsequent to said reducer-adding unit adding said reducer when a difference between said air-fuel ratio value detected by said upstream-side air-fuel ratio detecting unit and said air-fuel ratio value detected by said downstream-side air-fuel ratio detecting unit is substantially said target value, become predetermined target air-fuel ratios.

10. The exhaust purification system for an internal combustion engine according to claim 6, wherein
said reducer-adding unit changes a reducer-adding rate such that said air-fuel ratio value detected by said upstream-side air-fuel ratio detecting unit and said air-fuel ratio value detected by said downstream-side air-fuel ratio detecting unit, during a predetermined period subsequent to said reducer-adding unit adding said reducer when a difference between said air-fuel ratio value detected by said upstream-side air-fuel ratio detecting unit and said air-fuel ratio value detected by said downstream-side air-fuel ratio detecting unit is substantially said target value, become predetermined target air-fuel ratios.

* * * * *

UNITED STATES PATENT AND TRADEMARK OFFICE
CERTIFICATE OF CORRECTION

| | |
|---|---|
| PATENT NO. | : 7,832,199 B2 |
| APPLICATION NO. | : 11/631778 |
| DATED | : November 16, 2010 |
| INVENTOR(S) | : Shunsuke Toshioka |

It is certified that error appears in the above-identified patent and that said Letters Patent is hereby corrected as shown below:

Title Page,
Please delete:

(73) Assignee: Toyota Jidosha Kabushiki Kaisha, Tokyo (JP)

And replace with:

(73) Assignee: Toyota Jidosha Kabushiki Kaisha, Toyota (JP)

Signed and Sealed this
Twenty-fifth Day of January, 2011

David J. Kappos
*Director of the United States Patent and Trademark Office*